US008468014B2

(12) United States Patent
Master et al.

(10) Patent No.: US 8,468,014 B2
(45) Date of Patent: Jun. 18, 2013

(54) VOICING DETECTION MODULES IN A SYSTEM FOR AUTOMATIC TRANSCRIPTION OF SUNG OR HUMMED MELODIES

(75) Inventors: Aaron Master, Mountain View, CA (US); Seyed Majid Emami, Cupertino, CA (US)

(73) Assignee: Soundhound, Inc., Santa Clara, CA (US)

( * ) Notice: Subject to any disclaimer, the term of this patent is extended or adjusted under 35 U.S.C. 154(b) by 1199 days.

(21) Appl. No.: 12/263,827

(22) Filed: Nov. 3, 2008

(65) Prior Publication Data

US 2009/0125301 A1 May 14, 2009

Related U.S. Application Data

(60) Provisional application No. 60/985,181, filed on Nov. 2, 2007.

(51) Int. Cl.

| | |
|---|---|
| ***G10L 11/04*** | (2006.01) |
| ***G10L 19/14*** | (2006.01) |
| ***G10L 11/06*** | (2006.01) |
| ***G10L 15/20*** | (2006.01) |
| ***G10L 21/00*** | (2006.01) |
| ***A63H 5/00*** | (2006.01) |
| ***G04B 13/00*** | (2006.01) |
| ***G10H 7/00*** | (2006.01) |
| ***G10H 5/00*** | (2006.01) |

(52) U.S. Cl.
USPC ........... 704/208; 704/205; 704/206; 704/207; 704/214; 704/233; 704/270; 704/270.1; 704/275; 84/649; 84/609; 84/616; 84/654

(58) Field of Classification Search
USPC ................. 704/208, 205, 206, 207, 214, 233, 704/270, 270.1, 275; 84/600-601, 609, 615, 84/649, 653
See application file for complete search history.

(56) References Cited

U.S. PATENT DOCUMENTS 5,088,380 A * 2/1992 Minamitaka .................... 84/637
5,302,777 A * 4/1994 Okuda et al. .................... 84/637

(Continued)

FOREIGN PATENT DOCUMENTS

JP 2004-102146 A 4/2004
KR 10-2003-0062369 A 7/2003

OTHER PUBLICATIONS

Klapuri, A.P.; , "Multiple fundamental frequency estimation based on harmonicity and spectral smoothness," Speech and Audio Processing, IEEE Transactions on , vol. 11, No. 6, pp. 804-816, Nov. 2003.*

(Continued)

*Primary Examiner* — Edgar Guerra-Erazo
(74) *Attorney, Agent, or Firm* — Haynes Beffel & Wolfeld LLP; Ernest J. Beffel, Jr.

(57) ABSTRACT

The technology disclosed relates to audio signal processing. It includes a series of modules that individually are useful to solve audio signal processing problems. Among the problems addressed are buzz removal, selecting a pitch candidate among pitch candidates based on local continuity of pitch and regional octave consistency, making small adjustments in pitch, ensuring that a selected pitch is consistent with harmonic peaks, determining whether a given frame or region of frames includes harmonic, voiced signal, extracting harmonics from voice signals and detecting vibrato. One environment in which these modules are useful is transcribing singing or humming into a symbolic melody. Another environment that would usefully employ some of these modules is speech processing. Some of the modules, such as buzz removal, are useful in many other environments as well.

33 Claims, 5 Drawing Sheets

U.S. PATENT DOCUMENTS

| | | | | |
|---|---|---|---|---|
| 5,521,324 | A * | 5/1996 | Dannenberg et al. | 84/612 |
| 5,983,191 | A * | 11/1999 | Ha et al. | 704/500 |
| 6,281,422 | B1 * | 8/2001 | Kawamura | 84/615 |
| 6,556,967 | B1 * | 4/2003 | Nelson et al. | 704/233 |
| 6,785,645 | B2 * | 8/2004 | Khalil et al. | 704/216 |
| 6,787,689 | B1 * | 9/2004 | Chen | 84/600 |
| 7,191,128 | B2 * | 3/2007 | Sall et al. | 704/233 |
| 7,302,451 | B2 * | 11/2007 | Radhakrishnan et al. | 1/1 |
| 7,709,723 | B2 * | 5/2010 | Pachet et al. | 84/603 |
| 7,919,706 | B2 * | 4/2011 | Tsui et al. | 84/618 |
| 2002/0005110 | A1 * | 1/2002 | Pachet et al. | 84/635 |
| 2004/0255759 | A1 * | 12/2004 | Gayama | 84/613 |
| 2005/0086052 | A1 * | 4/2005 | Shih | 704/207 |
| 2005/0096898 | A1 * | 5/2005 | Singhal | 704/205 |
| 2006/0015327 | A1 * | 1/2006 | Gao | 704/207 |
| 2006/0015333 | A1 * | 1/2006 | Gao | 704/233 |
| 2006/0075881 | A1 * | 4/2006 | Streitenberger et al. | 84/609 |
| 2006/0080088 | A1 * | 4/2006 | Lee et al. | 704/207 |
| 2006/0095254 | A1 * | 5/2006 | Walker et al. | 704/207 |
| 2006/0150805 | A1 | 7/2006 | Pang | |
| 2006/0190450 | A1 * | 8/2006 | Holm et al. | 707/6 |
| 2006/0252536 | A1 * | 11/2006 | Shiu et al. | 463/36 |
| 2007/0163425 | A1 * | 7/2007 | Tsui et al. | 84/609 |
| 2007/0288232 | A1 | 12/2007 | Kim | |
| 2008/0053295 | A1 * | 3/2008 | Goto et al. | 84/616 |
| 2008/0202321 | A1 * | 8/2008 | Goto et al. | 84/616 |
| 2008/0300702 | A1 * | 12/2008 | Gomez et al. | 700/94 |
| 2009/0063138 | A1 * | 3/2009 | Sakurai et al. | 704/207 |

OTHER PUBLICATIONS

A. D. Cheveigne and H. Kawahara, "YIN, s fundamental frequency estimator for speech and 'music," Journal of Acoustical Society of America (JASA), Jan. 9, 2002, pp. 1917-1930.* de la Cuadra, P., Master, A., & Sapp, C. (2001). Efficient pitch detection techniques for interactive music. In Proceedings of the 2001 International Computer Music Conference, La Habana, Cuba.*

Huas, G., Pollastri, E., "An audio front end for query-by-humming systems", published in International Symposium on Music Information Retrieval conference proceedings, http://ismir2001.indiana.edu/pdf/haus.pdf, 2001, 8 pages.

Collins, N., "Using a Pitch Detector for Onset Detection", http://www.cogs.susx.ac.uk/users/nc81/research/pitchdetectforonset.pdf , Proceedings of 6th Int. Confernece on Music Information Retrieval, pp. 100-106, London, UK, 2005.

Qi, Y., Hunt, B.R., "Voiced-unvoiced-silence classifications of speech using hybrid features and a network classifier", IEEE Transactions on Speech and Audio Processing, vol. 1, Issue 2, Apr. 1993, pp. 250-255.

Herrera P., Bonada, J, "Vibrato Extraction and Parameterization in the Spectral Modeling Synthesis Framework", Proceedings of the Digital Audio Effects Workshop (DAFX98), 1998, 4 pages.

Rossignol S., Depalle P., Soumagne J., Rodet X., Collette, J. -I., "Vibrato: Detection, estimation, extraction and modification", In Proceedings of Digital Audio Effects Workshop (DAFx), http://echo.gaps.ssr.upm.es/costg6/bibliography/proceedings/rossignol.pdf, 1999, 4 pages.

Master, A., "Stereo Music Source Separation via Bayesian Modeling", Jun. 2006, dissertation, 199 pages.

International Search Report issued in corresponding PCT Application No. PCT/US2008/082256 on Apr. 28, 2009.

* cited by examiner

VOICING DETECTION MODULES IN A SYSTEM FOR AUTOMATIC TRANSCRIPTION OF SUNG OR HUMMED MELODIES

RELATED APPLICATION

This application is related to and claims the benefit of U.S. patent application Ser. No. 60/985,181 filed Nov. 2, 2007. The related application is incorporated by reference.

This application is related to the US patent application entitled "PITCH SELECTION MODULES IN A SYSTEM FOR AUTOMATIC TRANSCRIPTION OF SUNG OR HUMMED MELODIES," by the same inventors, which is beling filed simultaneously with this application.

This application is related to the US patent application entitled "VIBRATO DETECTION MODULES IN A SYSTEM FOR AUTOMATIC TRANSCRIPTION OF SUNG OR HUMMED MELODIES," by the same inventors, which is being filed simultaneously with this application.

BACKGROUND

The technology disclosed relates to audio signal processing. It includes a series of modules that individually are useful to solve audio signal processing problems. Among the problems addressed are buzz removal, selecting a pitch candidate among pitch candidates based on local continuity of pitch and regional octave consistency, making small adjustments in pitch, ensuring that a selected pitch is consistent with harmonic peaks, determining whether a given frame or region of frames includes harmonic, voiced signal, extracting harmonics from voice signals, and detecting vibrato. One environment in which these modules are useful is transcribing singing or humming into a symbolic melody. Another environment that would usefully employ some of these modules is speech processing. Some of the modules, such as buzz removal, are useful in many other environments as well.

Pitch selection, given candidate pitches for a frame of sound, is widely recognized as useful. See, e.g., Kwon, Y. H., D. J. Park and B. C. Ihm. "Simplified Pitch Detection Algorithm of Mixed Speech Signals." Circuits and Systems, 2000. Proceedings. ISCAS 2000 Geneva. the 2000 IEEE International Symposium on. Geneva, Switzerland, May 28-31, 2000; Marley, J. System and Method for Sound Recognition with Feature Selection Synchronized to Voice Pitch. U.S. Pat. No. 4,783,807. Nov. 8, 1988.

Classification of an audio signal into voiced, unvoiced and silence has been recognized as useful for a preliminary acoustic segmentation of speech and song. Qi, Y., and B. R. Hunt. "Voiced-Unvoiced-Silence Classifications of Speech using Hybrid Features and a Network Classifier." Speech and Audio Processing, IEEE Transactions on 1.2 (1993): 250-5. This segmentation is useful in both music transcription and speech recognition.

Vibrato is an ornamentation of vocal, string and other harmonic sound that varies in pitch (and sometimes in volume) about a selected pitch. Sundberg, J. "Acoustic and Psychoacoustic Aspects of Vocal Vibrato." Speech, Music and Hearing: Quarterly Progress and Status Report 35.2-3 (1994): 45-67. Nov. 1, 2008<http://www.speech.kth.se/prod/publications/files/qpsr/1994/1994_35_2-3_045-068.pdf>. Vibrato suppression is also useful for acoustic segmentation and for pitch detection. Collins, N. "Using a Pitch Detector for Onset Detection." 6th International Conference on Music Information Retrieval. London, Sep. 11-15, 2005. In many environments, flagging of frames that contain vibrato helps in pitch selection, for instance, to distinguish between a singer's ornamentation of pitch and alternation between pitches, such as trills.

Therefore, an opportunity arises to improve on the efficiency and accuracy of pitch selection, voicing detection and vibrato suppression or flagging. Improved audio processing components should lead to improved music transcription, voice recognition and acoustic processing.

SUMMARY

The technology disclosed relates to audio signal processing. It includes a series of modules that individually are useful to solve audio signal processing problems. Among the problems addressed are buzz removal, selecting a pitch candidate among pitch candidates based on local continuity of pitch and regional octave consistency, making small adjustments in pitch, ensuring that a selected pitch is consistent with harmonic peaks, determining whether a given frame or region of frames includes harmonic, voiced signal, extracting harmonics from voice signals, and detecting vibrato. One environment in which these modules are useful is transcribing singing or humming into a symbolic melody. Another environment that would usefully employ some of these modules is speech processing. Some of the modules, such as buzz removal, are useful in many other environments as well.

Particular aspects of the present invention are described in the claims, specification and drawings.

DETAILED DESCRIPTION

The following detailed description is made with reference to the figures. Preferred embodiments are described to illustrate the present invention, not to limit its scope, which is defined by the claims. Those of ordinary skill in the art will recognize a variety of equivalent variations on the description that follows.

Overview

Figure 2:
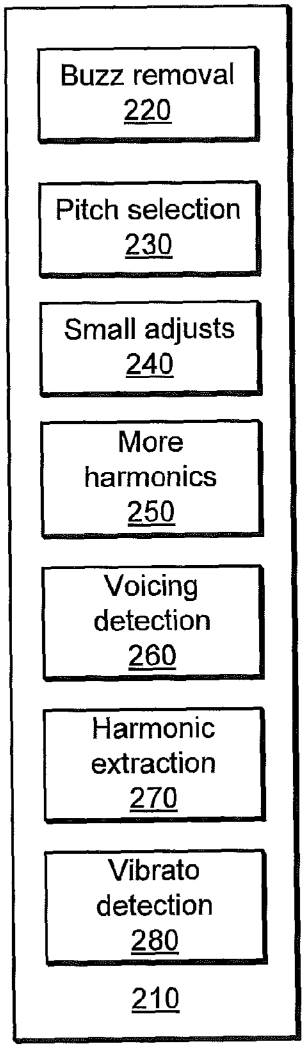
FIG. 2 is a high level block diagram of sung or hummed melody components, which may be used in various configurations.

It is often useful to have a symbolic representation or transcription of a sung or hummed melody. We presently describe several components that may be used in such a transcription system. FIG. 2 is a high level block diagram of these components, which may be used in various configurations. Typically, the available inputs that accompany frames in a stream of frames that represents an audio signal, include:

- The magnitudes and frequencies of the peaks in a spectrogram representation of the raw audio file input.
- One or more pitch candidates for each frame in the spectrogram representation.
- Likelihood scores for the pitch candidates.
- Magnitudes and frequencies of the peaks corresponding to the harmonics of one or more or the strongest pitch candidates in each frame according to other processing.
- The sum of the squares of the spectrogram magnitude values for each frame, over the following range: 0.5*p through 7.5*p, where p is one or more of the pitch estimates for the frame according to other processing.

These inputs can, alternatively, be derived using known techniques from raw audio input data, such as a digitally sampled audio signal.

To process these data into a symbolic representation of the sung or hummed melody, the system 210 may utilize some or all of the modules depicted in FIG. 2:

- A module 220 to identify and remove buzz or other band limited noise from the input data.
- A module 230 to select from among the one or more pitch candidates in each frame or to create a new candidate, based on local continuity of pitch and regional octave consistency.
- A module 240 to make small adjustments in the chosen pitch for each frame to facilitate tracking of harmonic energy.
- A module 250 to ensure that all harmonic peaks have been included in a frame, given a pitch for that frame.
- A module 260 to determine whether a given frame or region of the input constitutes a harmonic, voiced signal. In the present context, this module will also consider pitched single-harmonic signals (including whistling) to be a type of voiced signal.
- A module 270 to extract harmonics once voicing is determined.
- A module 280 to detect vibrato.

The output from these modules may include:

- Indication of whether frames are voiced audio. Some embodiments also may treat whistled audio as "voiced."
- A pitch estimate for each frame judged to be voiced.
- An indicator noting those frames in which vibrato was detected.

There are also "internal" input and outputs which are provided from one module or sub-module to another, as described below. We will also reference "user"-defined parameters in our descriptions. In this context, the user refers to the person configuring the system.

Figure 1:
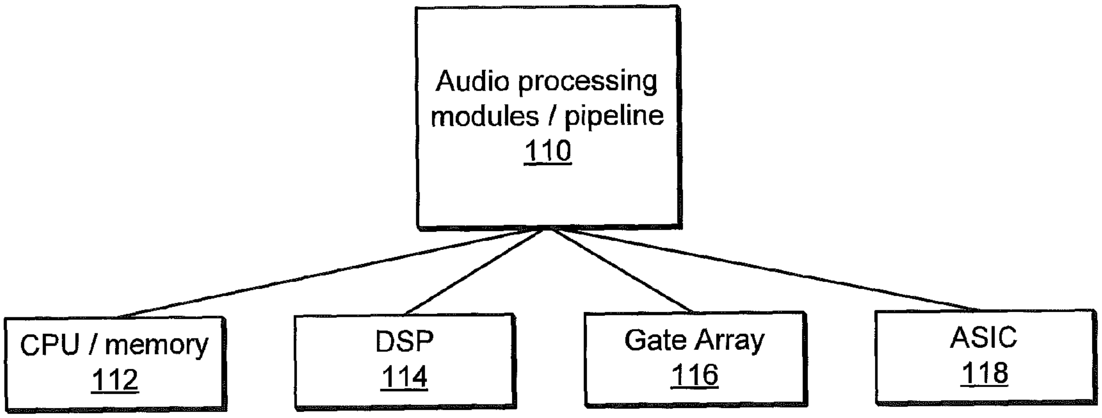
FIG. 1 illustrates the audio processing modules that can be implemented on a variety of hardware.

The audio processing modules described can be implemented on a variety of hardware, as depicted in FIG. 1. The audio signal processing modules 110 may be organized as a monolithic program or as several components or modules that run on separate threads allocated by an operating system 112 on a general purpose ASIC or RISC processor or digital signal processor 114. Alternatively, the modules may be organized as cells in the gate array 116 (field programmable gate array, programmable logic array, or other hardware array, programmable or masked), or as features of a special-purpose processor 118. Those of skill in the art will recognize that audio signal processing inherently involves electronic processing of electronic signals, as a mental process will never be productive or practically useful for transforming an acoustic signal sampled at even a modest rate of 8 kHz.

Module to Identify and Remove Buzz

The debuzzing module includes two sub-modules: first means for identifying the frequencies and magnitudes of buzz components in a file, and second means for removing buzz from a data set given these frequencies and magnitudes.

Buzz Detection and Characterization Sub-Module

The means for detecting and characterizing buzz can use as input, or generate form more basic inputs, the following:

- The magnitudes and frequencies of the peaks in frames of a spectrogram representation of a raw audio file input.
- The sum of the squares of the spectrogram magnitude values for each frame, over the following range: 0.5*p through 7.5*p, where p is the pitch estimate for the frame. We will call this quantity energy_raw_c.

The module seeks to find narrowband noise that occurs consistently during the quieter parts of the file. Narrow band noise tends to characterize buzzing, and detecting it will facilitate its removal, which in turn aids in music transcription, speech processing or other audio processing.

First, the module determines a noise floor by analyzing a histogram over the values of energy_raw_c. This histogram is as follows:

- The number of bins is equal to the number of frames divided by 20, though other values may also work well.
- Before being used in the histogram, energy_raw_c is scaled to correspond to simulated dB SPL (sound pressure level).
- The range is 0 to 100 dB SPL.
- The histogram is smoothed using a Bartlett window whose length corresponds to 10 dB SPL width.

The module analyzes the histogram, identifying two or more highest peaks. The peak corresponding to louder data is presumed to match the voiced speech, and the next peak corresponding to quieter data is presumed to correspond to silence or background noise. A threshold is set halfway between the quieter data peak and the valley between the two peaks. Data quieter than this value in SPL is assumed to correspond to background noise.

If two peaks are not found, the bottom decile of energy_raw_c frames is assumed to contain background noise. We refer to these quiet frames as low energy frames.

Next, the module works with the peak data from the low energy frames. It will analyze these data to see if certain peak frequencies occur much more often than would be expected from truly random noise. To do so, another histogram may be employed. As above, it uses a variable number of bins, based on the number of frequencies, and also employs smoothing. An iterative histogram peak-picking process follows as described:

- The highest peak in the histogram is detected. Its height is analyzed to determine if it represents that many more data points of this frequency are present than one would expect to see at random. (The number of data points that fall into the histogram bin should be 1.6 times more than the number that would fall into the bin randomly if there were a perfectly uniform distribution of data points. This factor is user-adjustable.)
- If the histogram peak is not sufficiently high, the algorithm stops iterating. However, if the histogram peak is sufficiently high, the next step is to determine how wide the histogram peak is. The peak width is relevant because wider peaks represent noise that has greater bandwidth. The histogram peak is expanded outward in frequency from the single peak bin until one of the following conditions is met: (1) we reach 0.33 of the height of the histogram peak (2) we reach the value corresponding to random chance of frequency presence (3) we reach the maximum noise bandwidth as set by the user. The expanded edges of the peak are noted and will be needed later.

Once the expansion is completed, all histogram bins in the included range are eliminated from the histogram. With this data eliminated, a new threshold for random data inclusion is calculated. Having this threshold, the system returns to the first step of the iteration above.

At this stage, the buzz detection algorithm has a set of frequency ranges in which buzz is believed to occur. These ranges correspond to the set of lower and upper bounds on frequency surrounding the histogram peaks. Now, the goal is to determine how loud the buzz was in each of these frequency zones. The system now goes back through all of the peak data in the low energy frames, and finds all of the peaks in each such frequency zone. For each zone, the median value is calculated. The median value is chosen to limit the impact of outliers and scaling (dB, squared magnitude, or other).

Now, the system has obtained estimates of the likely bandwidth and loudness of each buzz component. It will use this data in the second and final part of debuzzing: buzz removal.

Buzz Removal Sub-Module

The means for buzz removal is to remove data from the spectrogram peaks and magnitudes whose frequency and magnitude, when compared to the buzz frequency and magnitude identified by the previous buzz module, appears to be buzz. It also includes safeguards to protect against overly aggressive buzz removal. This module may be applied to any set of spectrogram peak data, including the peaks corresponding to the harmonics of one pitch candidate in each frame.

The basic rule is that in order to be eliminated as buzz, a peak must fall within the frequency zone identified as buzz. Additionally, other rules apply. A given peak's magnitude must be no louder than 3 dB above the detected median buzz magnitude for that zone. Also, when peaks within a buzz zone occur over several consecutive frames, the module may perform the following signal trajectory test. A peak may not be part of a string of peaks in the buzz zone that over time has frequencies that continue in the same direction (midi up or midi down) for 5 or more consecutive frames. More generally, a predetermined signal trajectory threshold may be applied. This was done because quiet voiced speech will often continue in a single-direction trajectory for several frames, while buzz data only very rarely does so.

When buzz is eliminated, the magnitude of a peak is set to zero, though its frequency and, optionally, magnitude data may be preserved to create a record of those peaks that were declared buzz by this module.

Module to Select or Create One Pitch Per Frame

In pitch transcription systems, it is typical to generate one or more pitch estimates per frame or time segment. Although there may be multiple estimates per frame, generally only one may be considered perceptually "correct" by a well-trained human listener. Additionally, octave errors (choosing a pitch double or half the correct frequency) are common in transcription systems, due to the typically harmonic structure of voice and musical instruments. Therefore, that one or even all of the pitch estimates for a given frame may initially be incorrect. Therefore, an algorithm that can correctly choose between several pitch candidates in a frame and correctly specify the octave of the pitch (even if that pitch or octave was not initially present among the estimates) is fundamentally useful.

The present pitch selection module 230 uses information across multiple frames to choose pitches and octaves from an initial set of frame-level estimates and supporting data. The module first groups similar "agreeing" estimates across neighboring frames into "streaks." Once the streaks are complete, the module goes streak by streak and chooses an octave for the pitches contained.

Figure 5:
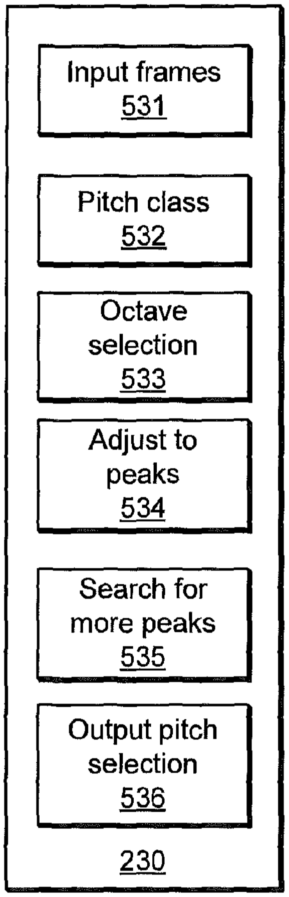
FIG. 5 is a high level block diagram of components that may be combined into a pitch selection module.

FIG. 5 is a high level block diagram of components that may be combined into a pitch selection module. These components also are useful standing by themselves for a variety of acoustic signal processing. Input component 531 may use an input port to electronically receive data. In various implementations, the input components may be software running on a general purpose processor, a function of a digital signal processor, a component in communications with a CPU or DSP, a cell in the gate array, or cell in a custom chip. An input component can be implemented in a wide variety of ways that combines software, firmware and hardware. The basic unit of input data is a frame. A sequence of frames represent an audio signal. A variety of data may be associated with the frame, including spectrographic data and at least one pitch estimate per frame. The pitch class component 532 handles both transformation of pitches to pitch classes 632 and construction of pitch streaks 633. The octave selection component 533 uses pitch class data and pitch estimate data across a number of samples to select an octave into which the pitch classes will be cast. Another module 534 makes small adjustments to an estimated pitch based on harmonic peaks in frequency found in the spectrogram data. Once the estimated pitch has been adjusted, a harmonic peak detection component 535 searches the spectrogram data to identify any harmonic peaks not previously analyzed. If additional peaks are found, based on a search using the adjusted the estimated pitch, the module to adjust peaks 534 may be invoked again using the additional harmonic data. An output component 536 makes available data related to the pitch of a frame, including intermediate data generated by any of the modules. As with an input component or port, the output component or port can be implemented using a wide variety of hardware, firmware and software. Or, it can be as simple as passing a parameter from one routine to another or putting data in memory to be accessed by a subsequent process.

The present module may use as input, or create from more basic inputs. The following:

A list of one or more pitch candidates per frame. The units may be midi or Hz of the fundamental frequency.

For some purposes, a corresponding list of scores for the candidates. A higher score represents a candidate the other processing determined was more likely to represent the correct pitch in the frame.

The values of energy_raw_c, one per frame, as defined above.

The output will include a single pitch estimate per frame.

To choose a pitch in each frame, the present module will consider the score of the candidates and the continuity of each candidate with previous candidates. In addition, the current module will choose an octave for the pitch estimates.

The module begins by converting all pitch candidates to a pitch class value, though the pitch including octave information is also retained. Pitch class is an octave-independent number between 0 inclusive and 12 exclusive that represents the note name of a pitch on a Western musical scale. A different number of pitches might be found in an octive of another music scale. Zero corresponds to the pitch C, one corresponds to C sharp, and so on. Of course, zero could be chosen to correspond to a different pitch. Modulo designation of pitches is done under the assumption, generally valid in pitch detection systems, that the pitch class of the pitch candidate is more reliable than the octave information of the pitch candidate. After choosing a pitch class with confidence, we can turn to correctly choosing the octave.

Figure 6:
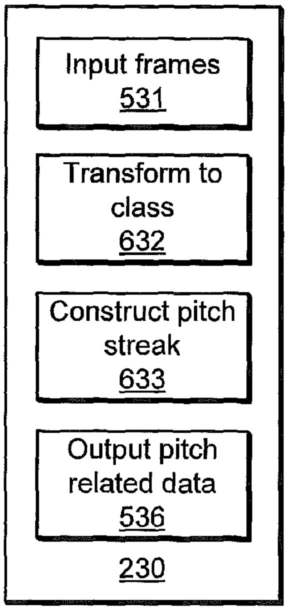
FIG. 6 is a high-level block diagram of components that may be used together to select the pitch class.

FIG. 6-9 elaborate on the pitch selection components depicted in FIG. 5. FIG. 6 is a high-level block diagram of components that may be used together to select the pitch class. An input component electronically receives data frames. Transformation means 532, coupled to the input, assign equal pitch classes to pitches in different octaves that have equal positions within their respective octaves. Streak constructor means 632 are coupled to the transformation means. The streak constructor means 633 assigns frames to one or more pitch class consistency streaks. In a consistency streak, consecutive frames have pitch class estimates within a predetermined pitch margin of one another. An output component 536 or port makes the results from the pitch class selection available to other components.

Figure 7:
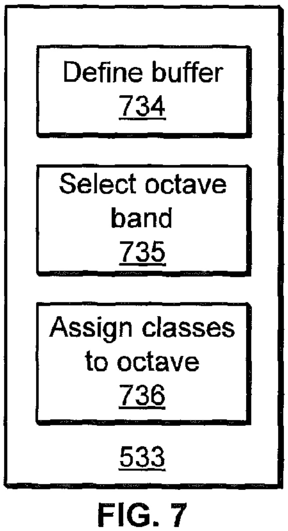
FIG. 7 is a high-level block diagram of components that build on pitch class selection and assign pitch classes to a particular octave.

FIG. 7 is a high-level block diagram of components that build on pitch class selection and assign pitch classes to a particular octave. The means for octave selection defines a buffer 734, selects an octave band based on analysis of frames in the buffer 735, and assigns the pitch classes to pitches in the selected octave 736. Working in conjunction with the pitch class modules, data relevant to pitch is output for further processing.

Figure 8:
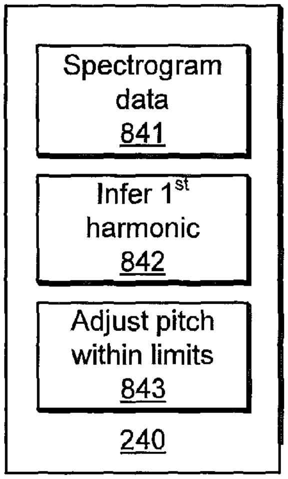
FIG. 8 is a high-level block diagram of components that can be combined into a small adjustment module, to make a small adjustment to an estimated pitch, based on harmonic peaks within spectrogram data for a frame or series of frames.

FIG. 8 is a high-level block diagram of components that can be combined into a small adjustment module, to make a small adjustment to an estimated pitch, based on harmonic peaks within spectrogram data for a frame or series of frames. These components operate on spectrogram data 841. An inference component 842 infers a first harmonic frequency based on second and higher harmonics present in the spectrogram data. A pitch adjustment component 843 compares a candidate pitch to the inferred first harmonic frequency and adjusts the candidate pitch, if it is close enough to the inferred frequency.

Figure 9:
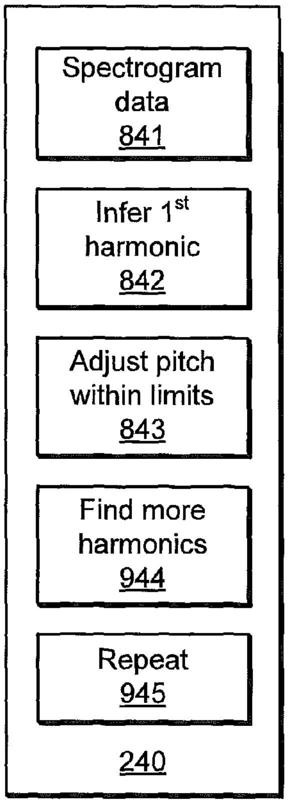
FIG. 9 is a high-level block diagram of small adjustment components, described above, and harmonic search components that use the adjusted pitch to make a refined search through the spectrogram data for harmonic peak data that may have been missed in earlier processing.

FIG. 9 is a high-level block diagram of small adjustment components, described above, and harmonic search components 944 that used the adjusted pitch to make a refined search through the spectrogram data for harmonic peak data that may have been missed in earlier processing. For instance, a small error in estimating the fundamental frequency may produce a large error in estimating the 10th harmonic and cause a system to miss upper harmonic data that is present in the spectrogram. In FIG. 9, the first three components are familiar from FIG. 8. The figure depicts an additional component for finding more harmonics 944 and an iterator 945 that repeats the adjustment of pitch within limits 843 in appropriate circumstances.

Pitch Streak Creation

Considering the pitch class data, the means for pitch streak creation finds streaks of pitch candidates that are close in pitch class to one another over a number of consecutive frames. In one embodiment:

The first frame initializes one trajectory for each candidate it contains. For example, if there are three pitch candidates in the first frame, then there are three streaks initialized. For example, say the first frame's three pitch candidates (in midi pitch numbers) are:

| | | |
|---|---|---|
| 0.3 | 4.2 | 10.8 |

Then the we would initialize pitch streaks 1, 2, and 3:

| | | |
|---|---|---|
| 1 | 2 | 3 |

The module proceeds one frame at a time. Within each frame, each candidate is considered.

The candidate is analyzed for pitch class distance to the streak pitch value in the previous frame. Because the pitch class is circular on the range 0 through 12, distances larger than 6 are converted to 12 minus the distance. By definition, pitch class distance can never be greater than 6. Let's continue the above example, and say that the first two frames of pitch class data are as follows:

| | | |
|---|---|---|
| 0.3 | 4.2 | 10.8 |
| 0.6 | 11.2 | 7.1 |

In this case, the pitch class distances are:

| | | Pitch class distances | | |
|---|---|---|---|---|
| Candidate | | 0.3 | 4.2 | 10.8 |
| 0.6 | vs | 0.3 | 3.6 | 1.8 |
| 11.2 | | 1.1 | 5.0 | 0.4 |
| 7.1 | | 5.2 | 2.9 | 3.7 |

If no previous frame candidate was within a parameter we call the "maximum intra-streak frame jump," then a new streak is begun for this candidate in this frame. We typically use the value 1.75. We have found that values in the range 1.2 to 2.0 are reasonable when using a time frame hopsize of 10 ms. Continuing the example above, we see that the third candidate (with a pitch class value of 7.1) has a minimum pitch class distance of 2.9, which exceeds 1.75. Therefore, it will begin a new streak. Since the highest indexed previous streak was 3, its new streak number will be 4.

If there is exactly one match within the maximum intra-streak frame jump, then that specific streak is continued in the current frame. Continuing the example above, we see that the first candidate (with a pitch class value of 0.6) has a minimum pitch class distance of 0.3, and that this is the only one of its pitch class distances below 1.75. Therefore, it will continue the streak indexed 1.

If there is more than one pitch class distance within the maximum intra-streak frame jump, then the candidate matches only the lower-indexed streak (generally, the one that has existed for more frames). Continuing the example above, we see that the second candidate (with a pitch class value of 11.2) has two pitch class distances below 1.75, one for streak 1 and one for streak 3. We break the tie by choosing the lower index, 1, even though in this case streak 1 and streak 3 are equally old. Alternatively, the two could be broken by choosing the smallest pitch distance, which would be streak 3.

At this point, each candidate in the frame has been assigned to a streak that existed in the previous frame, or has begun a new streak. Summarizing the streak indices for the first two frames, we have:

| | | |
|---|---|---|
| 1 | 2 | 3 |
| 1 | 1 | 4 |

Now it is also possible that two or more candidates in the current frame have been assigned to the same streak from the previous frame. However, the streak pitch can only take one value. Therefore, the candidates' midi pitches are averaged (after being forced into the same octave) and converted to pitch class. (This is necessary to avoid obtaining an invalid average when, for example, the matching pitch classes are 0.1 and 11.8. They should average to pitch class 11.95, not pitch class 5.95.) The averaged value is stored as the new streak pitch class value. The averaging measure prevents streaks from matching future candidates of diverging frequency. Continuing our example, we see that streak 1 has two candidates in frame 2. One has pitch class 0.6 and the other has pitch class 11.2. Averaging these in the same octave produces (11.2+12.6)/2=11.9. This value of 11.9 will be used for future pitch class distance comparisons.

Now that streaks have been formed, and because multiple streaks are likely to occur in each frame, the next tasks are to pick some streaks as higher priority than others, and to choose an octave for the streaks. To do this, we call on a piece of module input data we mentioned above: the list of preliminary scores for the pitch candidates. For the purposes of the current algorithm, we will not be concerned with the scores themselves, so much as which of the pitch candidates in each frame had the best preliminary score; we call this the "first place score." To establish an ordered list of high priority streaks, then, the streaks are first sorted by the number of first place scores their candidates contained. Streaks with fewer than two first place scores are not considered high priority, regardless of length. Next, we consider the sum of the energy_raw_c values for the frames each streak spanned. Any streak in the bottom 10% of all values for this measure (though this value may be user-adjusted) is removed from the high priority list. By taking these two steps in assigned streak priority, we greatly enhance the reliability of frequency estimates. This is because longer, louder streaks with more high-reliability (first place) candidates tend to contain valid pitch data as opposed to pitch data generated during silence or non-pitched speech or background sounds.

At this point, we have an ordered list of high priority streaks. The module will now choose an octave for the pitch classes in each high priority streak starting with the highest priority one and proceeding until all high priority streaks are finished. When there is more than one streak present in a given frame, the higher priority streak is the one whose pitch and octave value is written to the output. Nonetheless, all values in a streak may contribute to the octave decision process described below, even though their pitch values may not be written to the output.

Octave Selection

To choose the octave, the means for octive selection employs a variable length buffer that starts at length 15 frames (which in our system represents about 750 ms), a length we term the "octave window length." Other octave window lengths may be chosen, such as 500 ms or 1000 ms, and may be expanded indefinitely, one octave window length at a time, as long as certain conditions described below are met. Once the conditions for expanding the octave buffer are no longer met, or whenever the entire streak is less than the octave window length and thus is the entire buffer, an octave is chosen for the elements in the buffer as follows:

Consider the midi values (not the pitch classes) for every candidate included in the buffer, recalling that there may be more than one candidate per frame included. As an example, consider the following list of streak pitch values. Rows listing more than one value represent frames where two or more candidates were considered participants in the same streak

| | |
|---|---|
| 62.0 | |
| 62.2 | |
| 62.5 | 75.3 |
| 64.0 | |
| 75.8 | 63.2 |
| 63.9 | 75.7 |
| 64.4 | |
| 64.8 | |
| 65.0 | 77.0 |
| 66.0 | |
| 78.5 | 66.4 |
| 79.1 | |
| 67.2 | |
| 67.5 | |
| 67.7 | |

Make a midi-ordered list of the values. Optionally, for every first place candidate, include the midi value twice. Doing so from the example generates this sorted buffer:

| | | | | | | | | | |
|---|---|---|---|---|---|---|---|---|---|
| 62.0 | 62.2 | 62.5 | 63.2 | 63.9 | 64.0 | 64.4 | 64.8 | 65.0 | 66.0 |
| 66.4 | 67.2 | 67.5 | 67.7 | 75.3 | 75.7 | 75.8 | 77.0 | 78.5 | 79.1 |

Take the central item from this list. For a list of length N, the central item is defined as item N/2 when N is even and item (N+1)/2 when N is odd. It is preferred not to take an average between two values when there is an even number of samples, because it could result in averaging two values from different octaves. The midi value of the central item is termed the midi reference. Recall that the midi value is not just a pitch class and does include octave information. In the present example, there are 20 values. Therefore, we will consider the 10th one, which is 66.0, to be our midi reference.

Finally, for every midi value in the buffer, retain the pitch class but choose an octave such that the midi value will be closest to the midi reference. We note that in doing so, we may choose to place a candidate's pitch class in a different octave than the candidate itself. Thus, in certain frames, we actually create new pitch candidates. In the current example, the pitch classes in the sorted buffer are:

| | | | | | | | | | |
|---|---|---|---|---|---|---|---|---|---|
| 2.0 | 2.2 | 2.5 | 3.2 | 3.9 | 4.0 | 4.4 | 4.8 | 5.0 | 6.0 |
| 6.4 | 7.2 | 7.5 | 7.7 | 3.3 | 3.7 | 3.8 | 5.0 | 6.5 | 7.1 |

We now choose octaves for these pitch classes closest to the midi reference value of 66.0, or in other words, midi pitches between 60.0 and 72.0, with ties broken by choosing the closer one to 66.0. This leaves us with the following time-ordered sequence:

| |
|---|
| 62.0 |
| 62.2 |
| 62.5 |
| 64.0 |
| 63.2 |
| 63.9 |
| 64.4 |
| 64.8 |
| 65.0 |
| 66.0 |
| 66.4 |
| 67.1 |
| 67.2 |
| 67.5 |
| 67.7 |

We note that a new candidate pitch was created for the fourth frame from the end, because the only candidate pitch for that frame was not in the chosen octave.

Recall that the buffer may be expanded to greater than a single octave window length under certain conditions. We now describe the module's approach to creating, expanding, terminating, and processing buffers.

First, the module initializes a buffer using the first <<octave window length>> frames in a streak.

It computes a midi reference value in the same fashion as when choosing an octave (as described above). It also computes pitch class distances from all candidates in the buffer to the pitch class for the midi reference.

If any of the pitch class distances in the buffer exceeds a threshold termed the <<midi stability distance>>, then octave buffer expansion is terminated, the buffer is processed for octave choice, and a new octave buffer is begun starting in the frame following the current buffer. The motivation here is to check whether or not the buffer shows a fast drift in pitch versus time that cannot be explained by octave errors. If this occurred and we were to continue expanding the buffer, we would risk including pitches genuinely in different octaves in the same octave decision. On the other hand, we always want to include as many frames as possible when making an octave decision, because doing so reduces the chances of making an incorrect octave decision.

If all of the pitch class distances are within the <<midi stability distance>>, then the module considers expanding the buffer by an additional <<octave window length>> frames as follows:

First, it checks to see if the new window is self-stable, testing whether the pitch classes in the new window are within the <<midi stability distance>> of the midi reference calculated just for the new window. If this test fails, then the buffer is not extended, but rather is terminated at the end of the last window, and processed for octave. Additionally, the new, self-unstable window is both started and terminated as one new buffer and processed for octave. However, if the test passes, then a second test is performed:

It checks whether any of the new window's pitch class distances to the original (buffer's previously existing value) of the midi reference exceed a different threshold, the <<midi octave split>> value. If they do, then the buffer is not extended, but rather is terminated at the end of the last window, and processed for octave. Additionally, the new self-stable window is started as a new buffer for possible continuation. However if this second test passes, then the buffer is expanded to include the current window, and the next window is considered for expansion, using the two tests described here.

There are two issues with buffer termination at the end of a streak. If a buffer needs to be extended but the streak does not have enough frames left to form a complete <<octave window length>> window, then the window simply extends only to the end of the streak. Second, a buffer that reaches the end of a streak without being terminated is automatically terminated when it reaches the end of a streak.

At this point, we have chosen octaves for all candidates in each streak. We have also chosen a streak to own most frames, using the high priority streaks. Now, only two tasks remain. First, we choose pitches for those frames in which no high priority streak exists. Second, when there is more than one candidate in a streak, we must only one, as we want to assign only one pitch value per frame.

The first task is simple. Because there is very little contextual information for frames that do not participate in any high priority streak, we simply take the first place candidate for such frames, including whatever octave was chosen for it.

Viterbi Algorithm for Smoothness

For the second task, the module employs the Viterbi algorithm to choose the smoothest trajectory through the streak's candidates in the first order sense. That is, the optimization criterion is that the difference between consecutive midi pitch differences be minimized. Only a single frame window and the first order difference were used, though longer windows or higher order differences could be used.

Once this has been done, the module has assigned a pitch value for each frame and thus the desired output has been obtained.

Modules to Make Small Adjustments in Pitch

In music transcription systems, the preliminary pitch estimate or estimates for each frame may be only approximate. This may occur when a quicker but less accurate algorithm is chosen to perform early estimates of pitch. Even if a rigorous algorithm chooses continuous zones of pitch or octaves, the pitch estimates themselves could be slightly off.

One factor leading to errors in pitch estimates made in an FFT-based system is FFT bias. This bias, also referred to as crosstalk, directly affects the information in the FFT most often used to compute pitch estimates. It effects the frequencies and magnitudes of the harmonic peaks.

Various approaches to minimizing this problem have various drawbacks. One idea is to use as long an FFT analysis window as possible, such as 50 ms or more. Doing so leads to narrower window transforms and therefore less interference between harmonics. However, windows longer than 50 ms may cover enough time that the pitch changes during the window. When this happens, the harmonics become spread out and interfere with one another. Using 50 ms windows is a good compromise, but if the FFT used must also produce data to be used by a speech processing system, then 50 ms is usually too long a window; 25 ms is better. A 25 ms window will unfortunately often have a significant amount of bias, as wide window transforms lead to interfering or unresolved harmonic peaks. Increasing the sampling frequency may ameliorate some issues with a 25 ms window.

Below, we describe a method to minimize the effect of FFT bias on pitch estimates by analyzing the frequencies and magnitudes of the detected harmonics and using them to adjust the estimated pitch. We also describe a method to use a possibly adjusted pitch value to ensure inclusion of all relevant harmonics.

Before making small adjustments, the audio signal processing has produced pitch estimates for each frame in the system. These pitch estimates have been chosen from pitch candidates based on their smoothness relative to each other and consistency of octave.

While these pitch estimates are directly useful for estimating sung pitches, we also use them in a less direct manner. We can use frame-level pitch data to assist indirectly in estimating whether or not voicing (or pitched data) occurs, and where syllable onsets occur. Specifically, we can use the pitch to identify those peaks from the spectrogram representation that correspond to harmonic components of the signal in each frame. For example, if a frame had a pitch estimate of 105 Hz, then we might look for peaks that have frequencies at 105, 210, 315, 420, etc. Hz. Similarly, we might work backwards if we already have harmonic peak data: if we have peaks at 110, 220, 330, and 440 Hz but a frame pitch estimate of 108 Hz, we might assume that our estimate was too low and should be 110 Hz. In either case, the goal is to ensure that we have found the harmonic peaks in the frame and that the pitch for the frame accurately represents them.

The next two modules perform these tasks. The frame pitch correction module uses existing harmonic peak estimates to refine our pitch estimate for each frame. This is only relevant for those frames in which we already have harmonic peak data. We recall that in the current system, a single pitch estimate for each frame—and supporting data—had already been generated by a previous system. Specifically, in addition to the pitch estimate, we have matrices encoding the magnitude and frequency of harmonic peaks that contributed to the estimate of frequency for each frame. (A similarly sized matrix would contain the magnitude values of the peaks.) Therefore, we may use these matrices in a module that refines pitch estimates. Once the pitch estimate is refined, we may go back and check that we included all harmonic peaks.

For other frames where the pitch has been changed significantly by the above processing, we do not yet have harmonic data. In those frames, we must start by looking for harmonic peaks. Then, we may use those peaks to correct the pitch, before once more checking for all harmonic peaks.

We see then, that these two modules could be used in indefinite iteration. However, we found that a single iteration of the form described above was sufficient.

Module to Make Small Adjustments in the Pitch Based on Frequencies of Harmonic Peaks The means for making small adjustments or "micro-corrections" to frame pitch estimates operates on one frame at a time. It can use the following as input, or derive these from more basic inputs:

The frequencies of peaks estimated elsewhere as harmonic. We term this harmonic_frequencies.

The squared magnitudes of these peaks. We term this harmonic_magnitudes.

The pitch estimated in a frame.

The module outputs the following:

A possibly adjusted estimate of pitch for the frame.

An updated set of frequencies and magnitudes of the peaks used in the module, with peaks judged to be irrelevant deleted.

The basic idea in this module is to use the frequencies of the first few harmonics to refine the pitch estimate in a given frame. For example, if the first four harmonics had respective frequencies of 210, 420, 630, and 840 Hz, the harmonic model indicates that the fundamental frequency is 210 Hz, even if the original pitch estimate for the frame were different, say 220 Hz. This is an idealized example, and often the first four harmonics will not agree so consistently, or even suggest that the pitch should be changed in the same direction. However, the evidence is often very strong in one direction, and disagreements sometimes come only from spurious harmonic_peaks.

It is important to make small adjustments such as this to the pitch, because at higher harmonics the effect of a small pitch error can be very significant and result in failing to identify a high-frequency spectrogram peak as harmonic. For example, the tenth harmonic for a 210 Hz fundamental is 2100 Hz, but the tenth harmonic for a 220 Hz fundamental is 2200 Hz. When seeking a tenth harmonic to track (which is done in the next module), the module is unlikely to find the correct tenth harmonic when it is looking in a location 100 Hz from the correct value.

The module begins by determining the "ideal harmonic frequencies" given the original pitch estimate for the frame. For example, if the original pitch estimate is 220 Hz, the ideal harmonic frequencies would be 220, 440, 660, 880, 1100, 1320, etc. Hz.

$$\text{ideal\_harmonic\_frequencies}(i)=i\cdot\hat{f}_0$$

Next, we subtract these ideal harmonic frequencies from harmonic_frequencies (say, 210, 420, 630, and 840 Hz for the first four harmonics). The units for this difference are Hz, with positive Hz indicating that the harmonic_frequencies values were too high for the given pitch estimate, negative Hz indicating that they were too low, and 0 Hz indicating exact agreement. In this example, the differences would be −10, −20, −30, and −40 Hz. (In reality, we may think of this data in the opposite sense, where the pitch estimate is the quantity that is too high or too low.) We may write:

$$\text{harmonic\_difference\_frequencies}(i)=\text{harmonic\_frequencies}-\text{ideal\_harmonic\_frequencies}$$

Given these difference values in Hz, we first normalize them relative to their harmonic number by dividing by their harmonic number, and we term this the normalized relative error. In the current example the first four values for this quantity would be −10, −10, −10, and −10. We may write:

$$\text{normalized\_relative\_error}(i)=\frac{\text{harmonic\_difference\_frequencies}(i)}{i}$$

Next, we again normalize relative to the original pitch estimate by dividing the normalized difference values (−10, −10, −10, and −10) by the pitch estimate. In this example, that generates −0.0455, −0.0455, −0.0455, and −0.0455. We may write:

$$\text{pitch\_normalized\_harmonic\_differences}=\frac{\text{normalized\_relative\_error}(i)}{\hat{f}_0}$$

A value which is off by more than the original pitch will have a value above 1.0; however, in such a case it is possible the harmonic used was actually the wrong number harmonic. For example, if the fifth harmonic were 220 Hz too high relative to the estimated pitch, it is possible that it was misidentified as the fifth harmonic and should have been the sixth harmonic. The module does not attempt to reassign peaks to different harmonics, as that task is outside the scope. Instead, it deletes from consideration any harmonic whose normalized distance is greater than 0.5. For obvious reasons the module also ignores any "empty" harmonics where no peak is present in harmonic_frequencies. Also, the module uses only the second through eighth harmonics, (though other upper harmonic limits may be used), to try to limit cases where misidentification of the harmonic index could occur.

At this point, we have a buffer of normalized eligible errors of frequency represented by our harmonic_frequencies relative to our original estimated pitch. Next, the module will use this buffer to adjust the estimated pitch.

To do so, it performs a special clustering to see if there is a consensus shown by the buffer values regarding how to adjust the estimated pitch. We presently describe this.

First, the module determines whether positive or negative signs are more common in the buffer of pitch_normalized_harmonic_differences, where we recall that a positive sign indicates the harmonic_frequencies are too high given the estimated pitch. Consider an example where the pitch estimate is 200 Hz, and the second through eighth harmonic_frequencies, normalized_relative_error, and pitch_normalized_harmonic_differences respectively are:

| | | | | | | | |
|---|---|---|---|---|---|---|---|
| 396 | 570 | 752 | 1010 | 1152 | 1316 | 1600 | (Hz) |
| −2 | −10 | −12 | 2 | −8 | −12 | 0 | (Hz) |
| −0.01 | −0.05 | −0.06 | 0.01 | −0.04 | −0.06 | 0.0 | (versus pitch estimate) |

In this case, five of the seven values are negative.

Next, it deletes all buffer values that fall in the minority. In the example, that leaves us with:

| | | | | |
|---|---|---|---|---|
| −0.01 | −0.05 | −0.06 | −0.04 | −0.06 |

Then the module checks that there are at least two values remaining in the buffer (in the example there are), that we have at least 60 percent of the total number of values before the minority values were deleted (we have 5 of 7 or 71% so we do), and that the pitch estimate is below a fixed ceiling. Let's say the pitch estimate had been 200 Hz and that the ceiling was 250 Hz, so the test is passed. (This last step is done because pitch correction above a certain value tended to do more harm than good.) If any condition is not met, no correction is performed. If all of these conditions are met, the module continues.

First, the buffer is sorted. In the example, that gives us:

| | | | | |
|---|---|---|---|---|
| −0.06 | −0.06 | −0.05 | −0.04 | −0.01 |

Next, the distance from each buffer element to the median is calculated, as is the maximum spread in the buffer. In the example, the median is −0.05, the distances are 0.01, 0.01, 0, 0.01, and 0.04, and the maximum spread is 0.05. Then, any values that are further away from the median than a fixed percentage (half the "maximum spread") are deleted. In this case, half the maximum spread is 0.05/2 or 0.0025. Only one distance, 0.04, is greater than that, so it is discarded. This leaves us with four example values:

| | | | |
|---|---|---|---|
| −0.06 | −0.06 | −0.05 | −0.04 |

The logic here is that certain harmonic_frequencies values could be spurious even if their corresponding buffer values voted with the majority in choosing the direction to change the estimated pitch. At this point, we may have deleted a significant number of the values from the original buffer. Before continuing, we confirm that we still have at least 40 percent of the number of values before we deleted the minority votes. If this condition is not met, no correction is performed. In the example, we have four of the original seven values, or 57%. Therefore, we continue on with pitch correction.

If the condition is met, the module continues, using the remaining values in the buffer to inform the correction process. For this step, the normalized buffer values in Hz (the "normalized relative error") are used. In the example, we recall that the third, fourth, sixth, and seventh harmonics' data are being used, corresponding to:

| | | | |
|---|---|---|---|
| −10 | −12 | −8 | −12 |

The module takes a median value of the normalized relative error. In the example, the median here is −11 Hz. If this median represents less than a fixed "maximum adjustment" when divided by the original pitch estimate in Hz, the module continues, by adding the median value (positive or negative) to the original pitch estimate in Hz. (Otherwise, as above, no pitch change is made.) In the example, the original pitch estimate is 200 Hz, so an 11 Hz downward adjustment represents a 5.5% change. A typical value for the change ceiling would be 0.75 midi, or about 4.4%. Therefore, in the example, the change would be ignored.

Before keeping a change, the module performs three tests to see if the old pitch was better than the new one. To perform these tests, first the module needs to collect some data. First, as above, ideal harmonic frequencies are calculated, this time for the new pitch. Next, as above, the new ideal harmonic frequencies are subtracted from harmonic_frequencies. We term these differences the "Hz to ideal frequencies." These values are divided by the new pitch estimate, to obtain the "relative harmonic frequency error," a quantity that will be used at the end of the module. Now, using these data, four quantities are obtained:

The number of close harmonics for the old pitch: the number of the first eight (or other user adjustable number, such as five or ten) harmonics whose relative harmonic frequency error is within the maximum acceptable relative frequency error (a user adjustable parameter; in this case 0.24), when using the original pitch estimate.

The number of close harmonics for the new pitch: the number of the first eight (or other user adjustable number, such as five or ten) harmonics whose relative harmonic frequency error is within the maximum acceptable relative frequency error, when using the new pitch estimate.

The number of close lower harmonics for the old pitch: the number of the first five (or other user adjustable number, such as three or six) harmonics whose relative harmonic frequency error is within the maximum acceptable relative frequency error, when using the original pitch estimate.

The number of close lower harmonics for the new pitch: the number of the first five (or other user adjustable number, such as three or six) harmonics whose relative harmonic frequency error is within the maximum acceptable relative frequency error, when using the new pitch estimate.

In this respect the harmonic_frequencies values are treated as ground truth with the new and old pitch estimates treated as testable quantities.

Given the data for the number of close harmonic peaks and the number of close lower harmonic peaks for both the old and new pitch estimates, the module will perform three tests to determine if the old pitch or new pitch is a better match. If any of the three tests passes, the old pitch is judged to have been a better match. The three tests are as follows:

Test 1: Is the number of close lower harmonics fewer for the new pitch than for the old pitch?

Test 2: If the number of close lower harmonics is the same for both the new and old pitch, is the number of close harmonics fewer for the new pitch than for the old pitch?

Test 3: Are there at least five more close harmonics for the old pitch than for the new pitch?

If any of the three tests passes, the module reverts to the old (original estimated) pitch. Before concluding, this module checks to see if any of the relative harmonic frequency errors (calculated above for the new pitch, if the pitch was changed) exceed the maximum acceptable relative frequency error. For all harmonic_frequencies values that exceed this, the module forces the harmonic_frequencies and corresponding harmonic_magnitudes values to zero.

Module to Include More Harmonic Peaks

As mentioned above, the module to ensure inclusion of harmonic peaks works in tandem with the module to make small adjustments in frequency. While the frequency adjusting module takes harmonic peaks as ground truth and uses them to adjust the pitch, the current module takes the pitch as ground truth and uses it to find and confirm harmonic peaks.

The basic goal is to determine which, if any, of the spectrogram peaks for a given frame correspond to the harmonic peaks for a given frequency. To qualify, a given peak must meet three criteria:

It must have frequency closer to the ideal harmonic frequency than any other peak. For example, if the estimated pitch is 100 Hz and we are looking for the third harmonic, the ideal frequency is 300 Hz. To qualify as the third harmonic, a spectrogram peak must be closer to 300 Hz than any other peak.

The peak in question must be dominant, meaning that it is either louder than all other peaks within the region around the expected harmonic, or within 4 dB of their loudness. (This 4 dB flexibility is only needed in rare cases.) In the third harmonic of 100 Hz pitch example, the harmonic region would extend from 250 Hz to 350 Hz. (Frequencies below 250 Hz are closer to the second harmonic, and frequencies above 350 Hz are closer to the fourth harmonic.)

Additionally, even though the peak in question is the closest in the harmonic region and may be the loudest, it must also be within a finite range around the ideal frequency. The amount of flexibility in this regard is limited to 0.24 of the total harmonic region width in either direction (though this quantity is user-adjustable). This quantity is termed the maximum acceptable relative frequency error (and was used above.) So in the present example the peak in question would need to be between 276 Hz and 324 Hz.

If a peak passes all three tests, it is judged to be dominant and harmonic. It may be evident from the above criteria that a peak could be dominant (pass the second test) but not pass the other two. In this case, it is judged to be non-harmonic and dominant. Peaks which pass other combinations of tests (this includes all non-dominant peaks) are not of interest to this module, or to the system in general.

This module works on one frame at a time, and takes the following as input:

A pitch estimate for the frame.

The frequency and magnitude data for all spectrogram peaks detected in the frame.

(Optional:) Previously estimated frequency and magnitude data for harmonic peaks in the frame.

The module outputs one or more of the following:

The magnitudes of peaks judged as dominant and harmonic.

The magnitudes of peaks judged as dominant and non-harmonic.

The frequencies of all dominant peaks, harmonic or not.

Because of the optional harmonic peaks in the input, the module operates in a non-trivial fashion. We presently describe the method employed. It involves a large loop over each harmonic that could occur for a given pitch, starting at the fundamental (first harmonic) and continuing until either the highest chosen harmonic (chosen to be 45, though the number is user-specified) or a maximum frequency (chosen to be 5000 though the number is user-specified). For each harmonic the module does the following:

Calculate an ideal harmonic frequency. This is simply the harmonic number multiplied by the pitch estimate.

Determine the lower and upper bound on the harmonic region. This extends downwards from the ideal harmonic frequency by half the fundamental and upwards by the same amount.

Within the spectrogram peaks, find the peak closest to the ideal harmonic frequency that is also in the harmonic region. (If there is no such peak, then there is no dominant or non-dominant peak for this harmonic region, so skip this harmonic and move on to the next harmonic.)

Within the harmonic region, find the peak with the highest magnitude. If there was a previously estimated harmonic peak, compare its magnitude to the highest magnitude. If the previous estimate is within 4 dB, record the previously estimated harmonic as the dominant harmonic peak and record its frequency and move on to the next harmonic. If there is no previously recorded harmonic or if the previously recorded harmonic is not within 4 dB of magnitude, then continue as per the steps below.

Find the spectrogram peak closest to the ideal harmonic frequency, and determine if it is within the maximum acceptable relative frequency error, and if it is within 4 dB of being the loudest peak in the harmonic region. If it is, record this peak's magnitude as the dominant harmonic magnitude, and record the frequency. If one or more of these tests is failed, record the magnitude of the highest magnitude in the harmonic region as the dominant non-harmonic magnitude, and record the frequency.

At this point, we have recorded either 0 or 1 dominant peak for each harmonic. If the peak was judged to be harmonic, its magnitude is recorded in the dominant harmonic array. If it was judged to be non-harmonic, its magnitude is recorded in the dominant non-harmonic array. In either case, the frequency was recorded in the frequency array. In this manner, at most one peak is recorded for each harmonic, be it in one magnitude array or the other. But in either case the frequency is recorded in one frequency array.

Generalization of Pitch Assignment

One should not lose sight of the general principles underlying pitch class selection, octave selection, small adjustments to pitch and finding additional harmonics. These general principles can be applied in a wide variety of embodiments, including methods, devices, devices functionally described as means plus functions and computer readable storage media that include program instructions to carry out methods or to configure computing devices to carry out methods.

One embodiment related to pitch detection is a method of selecting a pitch class for a frame. The frame appears among a sequence of frames that represent an audio signal. The method includes processing electronically a sequence of frames that include at least one pitch estimate per frame. The method includes transforming the pitch estimates for the frames into pitch class estimates that assign equal pitch classes to pitches in different octaves that have equal positions within their respective octaves. While the example given above generally refers to a Western division of an octave into 12 notes, transforming the pitch estimates can be applied to any division of an octave into notes or even to a continuous span of an octave. The method includes constructing a least one pitch class consistency streak including pitch classes selected from consecutive frames that have pitch class estimates within a predetermined pitch margin of one another. Data regarding pitch content of the frames, based on at least the pitch classes in the pitch class consistency streak, are output for further processing.

Building on pitch class selection is octave selection. A method for octave selection assigns a pitch class to an octave. This begins by defining an octave selection buffer that includes all or some of the frames in the pitch class consistency streak. It includes selecting an octave-wide band based on analysis of pitches in the frames of the octave selection buffer. Then, the estimated pitch classes of the frames are converted into pitches by casting them into the octave-wide band, producing selected pitches. One aspect of selecting pitches via octave selection is the smoother may be applied to the selected pitches.

Building on pitch selection is small pitch adjustment. A method for making small adjustments in pitch applies a correction of no more than a predetermined adjustment band, thereby allowing the selected pitch to rise or fall by just a small amount. The method includes electronically processing spectrogram data for the frame. The method determines whether the selected pitch for the frames will be adjusted within the predetermined adjustment band to increase consistency between a selected pitch and frequencies of harmonic peaks in the spectrogram data. This small pitch adjustment has wide application and need not depend on the preceding steps of pitch class selection or octave assignment.

The small pitch adjustment can be combined with using the adjusted selected pitch to search the spectrogram data for the frame to find any additional harmonic peaks in the spectrogram data that were missed in earlier processing. When additional peaks are found, all of the relevant harmonic peaks are used to repeat the small pitch adjustment described in the previous paragraph.

A series of electronic signal processing components can be described, which follow from the methods disclosed. One electronic signal processing component is for selecting a pitch in frames that represent an audio signal. It includes an input port adapted to receive a stream of data frames including at least one pitch estimate per frame. It includes a modulo conversion component coupled to the input port the assigns equal pitch classes to classes in different octaves that have equal positions within their respective octaves. A streak constructor component, coupled to receive the assigned pitch classes from the modulo conversion component, assigns the frames to one or more pitch class consistency streaks of consecutive frames that have pitch class estimates within a predetermined pitch margin of one another. An output port is coupled to the streak constructor. It outputs data regarding pitch content of the frames based on at least the pitch classes in the pitch class consistency streak.

Another electronic signal processing component for octave selection is coupled between the streak constructor and the output port. It includes an octave selection buffer that receives all or some of the frames in the pitch class consistency streak and octave assignment logic. The logic selects an octave-wide band based on analysis of pitches in the frames in the octave selection buffer. The logic assigns the estimated pitch classes in the frames in the octave selection buffer to pitches in the octave-wide band, producing selected pitches.

Generally, the electronic signal processing components disclosed herein can be implemented using a range of software, firmware and hardware. For instance, in a digital signal processor (DSP) implementation, input and output modules and ports may be built into the hardware and other components loaded as software into the digital signal processor or memory accessible to the digital signal processor. In a general purpose CPU implementation, whether using an ASIC or RISC processor, most of the processing components can be implemented as software running on the CPU and utilizing resources coupled to the CPU. In a gate array implementation, the components may be cells in the gate array, whether the gate array is program or masked. The gate array may be a programmable logic array, a field programmable gate array or another logic implementation. One use of gate array implementations is to prototype custom devices. It should be understood that gate array implementations can often be converted into a custom chip implementation, if sales volume warrants or if power or performance requirements justify the custom design.

A further electronic signal processing component that can stand alone or be used in conjunction with the pitch class selection and octave selection components. This component is a pitch adjustment processor that processes the spectrogram data for the data frames. This pitch adjustment processor includes logic to calculate a first harmonic that would be consistent with harmonic peaks in the spectrogram. The logic compares the calculated first harmonic to a selected pitch for the frame and adjusts the selected pitch to increase consistency between the selected pitch and frequencies of harmonic peaks in the spectrogram data. This adjustment is limited to changes within a predetermined adjustment band.

The adjustment processor can further include logic to search the spectrogram data for the frame to find any additional harmonic peaks in the spectrogram data that are relevant to the adjusted pitch. If additional peaks are found, the logic invokes the small pitch adjustment logic to make a further adjustment in the estimated pitch.

Components for pitch selection also can be described as means for functions, relying on the corresponding technical details given above. In one embodiment, an electronic signal processing component includes an input port adapted to receive a stream of data frames including at least one pitch estimate per frame. It includes transformation means for assigning equal pitch classes to pitches in different octaves that have equal positions within their respective octaves. The transformation means is coupled to the inport port. It further includes streak constructor means for assigning the frames to one or more pitch class consistency streaks. The pitch class consistency streaks include consecutive frames that have pitch class estimates within a predetermined pitch margin of one another. The streak constructor means is coupled to the transformation means and to an output port.

A further aspect of this electronic signal processing component combines an octave assessment means with the foregoing transformation and streak constructor means. The octave assessment means is coupled between the streak constructor means and the output port. It is a means for selecting a pitch in the frames based on analysis of the estimated pitch classes in some or all the frames in the pitch class consistency streak.

As described below, any of the methods related pitch selection may be practiced as a computer readable storage medium including program instructions for carrying out a method. In addition, we disclose that program instructions on a computer readable storage medium may be used to manufacturer hardware or hardware loaded with firmware that is adapted to carry out the methods described. For instance, the program instructions may be adapted to run on a DSP or to configure gate array, either a gate array produced in the field or a gate array programmed during manufacturing.

Module to Detect Voicing

In speech and music technology applications, it is often very useful to know whether or not a particular segment of audio contains a pitch. When performing music transcription, large errors result if a system attempts to estimate a pitch for a segment that is not voiced and locks a pitch. Conversely, if it is decided that a pitch does not exist when one in fact does, then another type of error occurs when "silence" is recorded instead of a pitch.

In the speech literature, "voicing" is a term often used to distinguish between the pitched or non-pitched status of a speech segment. "Voiced" means that the segment contains a pitch, "unvoiced" means that it does not, and "mixed voicing" or "partial voicing" means that the segment contains both pitched and unpitched sounds. By convention, voiced sounds are generally understood to be harmonic, meaning that a frequency analysis shows the presence of frequency components at integer multiples of the fundamental frequency. It should be understood that the methods described also have practical application to transcription of some musical content that may not stictly qualify as "voiced," such as whistled data, or any pitched louder sound on a recording including monophonic musical instruments, sinusoidal non-harmonic instruments such as a Theremin, or the loudest pitched component from a polyphonic instrument, such as the loudest melodic line on a piano, even if other notes are being played. The important concept is that any pitched sound that could be transcribed as a note can be detected as voiced, while any unpitched sound that could not be so transcribed should be detected as unvoiced. If a voiced and unvoiced sound occur simultaneously, we wish to label the segment voiced.

In the singing application, where many syllables are used by the singer, voicing is especially important, because many syllables in English (and in many other languages) alternate between voiced and unvoiced sounds. If voicing is accurately detected, then syllables are also often accurately detected.

In our research, we found that three criteria generally predict whether or not voicing occurs:

The amount of energy in the harmonics present in a frame.

The stability of the pitch estimate.

The presence of lower harmonics.

As noted above, the voicing decision is used to determine whether or not a pitch was present at a given moment in time. However, in order to make this voicing decision, we also need a pitch estimate for that moment in time. This fact should not lead to confusion. Just because previous processing estimated a pitch for a given moment in time does not mean that a pitch was actually there; it should only be viewed as the best guess at a pitch if in fact one was present. Only if a segment is judged to be voiced will the pitch estimate be considered as a pitch that will ultimately be transcribed.

Figure 3:
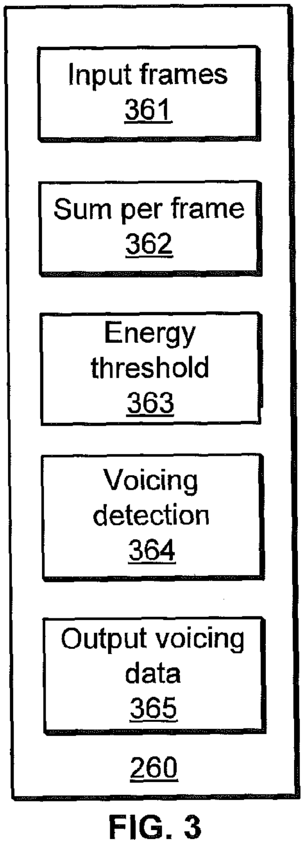
FIG. 3 is a high-level block diagram of components to may be combined into a voicing detection module or device.

FIG. 3 is a high-level block diagram of components to may be combined into a voicing detection module or device 260. An input component 361 or port electronically receives frames that represent an audio signal which includes voiced and unvoiced passages. The sequence of frames may include at least one pitch estimate per frame and one or more magnitude data per frame for harmonics of the pitch estimate. Or, more basic input can be accepted and the pitch estimates and magnitude data generated from the basic input. A summing component 362 calculates a sum per frame that combines at least some of the magnitude data. Optionally, the magnitude data can be limited to harmonics within a predetermined frequency band and input or by filtering. The summing component 362 may calculate the sum of magnitude squared for the relevant magnitude data. An energy threshold component 363 dynamically establishes a harmonic energy threshold to be used to identify frames as containing voiced content. The voicing detection component 364 identifies frames as containing voice content by comparing the calculated sum per frame to the dynamically established harmonic energy threshold. The output component 365 outputs data regarding voice content of the sequence of frames based on at least the identification of frames after filtering for harmonic energy.

In one embodiment, the voicing detection module includes tests of these three features of the input. To perform its work, this function takes the following two data as input:

The harmonic dominant magnitudes. These are used to judge the amount of energy in the harmonics present in a frame and the presence of lower harmonics.

The pitch estimate for each frame. This is used to judge pitch estimate stability and as a starting point for harmonic sequences.

For output, the system produces a binary indicator of voicing for each frame, a quantity we term vu_decision. To earn a vu_decision value of one, a frame passes some or all of three tests confirming each feature that characterizes voicing, as described above. We describe each of these three tests below.

Sufficient Harmonic Energy

The sufficient harmonic energy test is that a given frame contains enough harmonic energy. In general, voiced frames contain more energy than unvoiced frames. However, certain unvoiced frames such as those containing the sounds "sh" and "f" can have high amounts of energy, though that energy is non-harmonic. Therefore, high harmonic energy is detected. In order to determine what constitutes "high," however, the module normalizes data.

The first task, however, is to detect the amount of harmonic energy present in each frame within certain frequency limits. We call this the "low-frequency harmonic energy." For each frame, we do the following:

Consider the dominant harmonic magnitudes whose corresponding frequency falls between 59 and 2500 Hz, though other frequency ranges (going as low as 30 or 45 Hz or as high as 2000 or 4500 Hz) may be used. For example, consider the following data, which shows the magnitudes in estimated dB SPL of the various estimated harmonics. Though the values shown are integers (for convenience) they are continuous-valued. A zero just indicates that no harmonic peak was detected, not a peak of height zero. We will assume that the pitch estimate for all frames shown is 400 Hz. Rows going down represent the first through eighth harmonic, while columns from left to right represent sequential frames versus time.

| | T1 | T2 | T3 |
|---|---|---|---|
| 400 hz | 40 | 42 | 43 |
| 800 hz | 55 | 58 | 58 |
| 1200 hz | 60 | 61 | 62 |
| 1600 hz | 50 | 52 | 52 |
| 2000 hz | 35 | 37 | 37 |
| 2400 hz | 0 | 32 | 32 |
| 2800 hz | 0 | 29 | 30 |
| 3200 hz | 0 | 0 | 16 |

Take a sum over these magnitudes, ensuring that these magnitudes are in the squared magnitude domain before the sum operation. (To perform the conversion from the dB value X to the squared magnitude Y, apply Y=10^(X/10).) In the above example, because the pitch is 400 Hz, we only consider the first through sixth harmonics, because the harmonic frequencies are 400, 800, 1200, 1600, 2000, 2400, 2800, and 3200 Hz, placing the last two harmonics outside the specified frequency range of 59 through 2500 Hz. For the three frames, we obtain approximately:

| T1 | T2 | T3 |
|---|---|---|
| 1.4294 * 10^6 | 2.0708 * 10^6 | 2.4009 * 10^6 |

Convert the sum value back to a dB scale. In the above example, we obtain approximately:

| T1 | T2 | T3 |
|---|---|---|
| 61.6 dB | 63.2 dB | 63.8 dB |

Once this is done for each frame, smooth the results versus time (versus frame) by using a smoother. We use a 13 frame (about 650 ms) Hamming window, though other smoothing windows (such as Bartlett or Kaiser) or smoothing lengths (such as 500 or 1000 ms) may be used. The final result is termed the smoothed low-frequency harmonic energy.

Next we must determine whether the amount of harmonic energy detected in this way for each frame is sufficient to suggest voicing. Therefore, we create a histogram to determine the typical values for voiced energy in the file. To do so, we first determine the total voiced energy for each frame. (In practice, we found it better to use all frequencies for this rather than limit the frequency range as done just above.) Then, we create a histogram or other frequency distribution (such as Parzen-windowed) analysis using this data, typically with the following features:

- The number of bins in the histogram is equal to the number of frames divided by 20, though other values such as 15 and 25 could be used.
- The range of the histogram is from 0 to 100 dB SPL, though this range could be expanded on recordings where more dynamic range exists, for example to 196 dB.
- A smoother of width 15 dB (regardless of the number of bins) is used to smooth the histogram. We found a Bartlett window worked well though other types of smoothers could be used. For example, we could use a Hamming or Kaiser window and a smoothing width of 10 or 20 dB.

Figure 10:
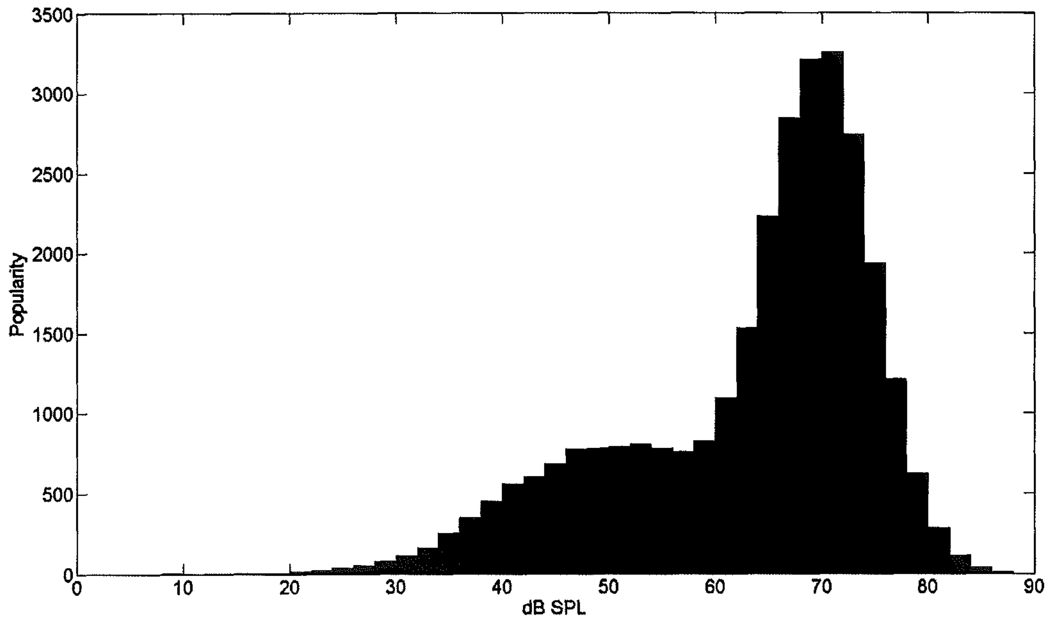
FIG. 10 is an example histogram showing the typical values for voiced energy in the file.

An example histogram is shown in FIG. 10. (The vertical axis numbers are not normalized; the plot is included only for illustrative purposes.)

Once the histogram is constructed this way, we find the highest volume index (corresponding to loudest dB SPL) histogram peak that is at least 25 percent as high as the highest value in the histogram. We also require that its corresponding dB SPL value be at least 45.

In the first example plot above, we see a clear and high histogram peak at about 70 dB SPL. This peak is the farthest to the right. It is also the highest peak in the plot, meaning that it is above 25% of the maximum because it is 100% of the maximum. Therefore it qualifies.

Figure 11:
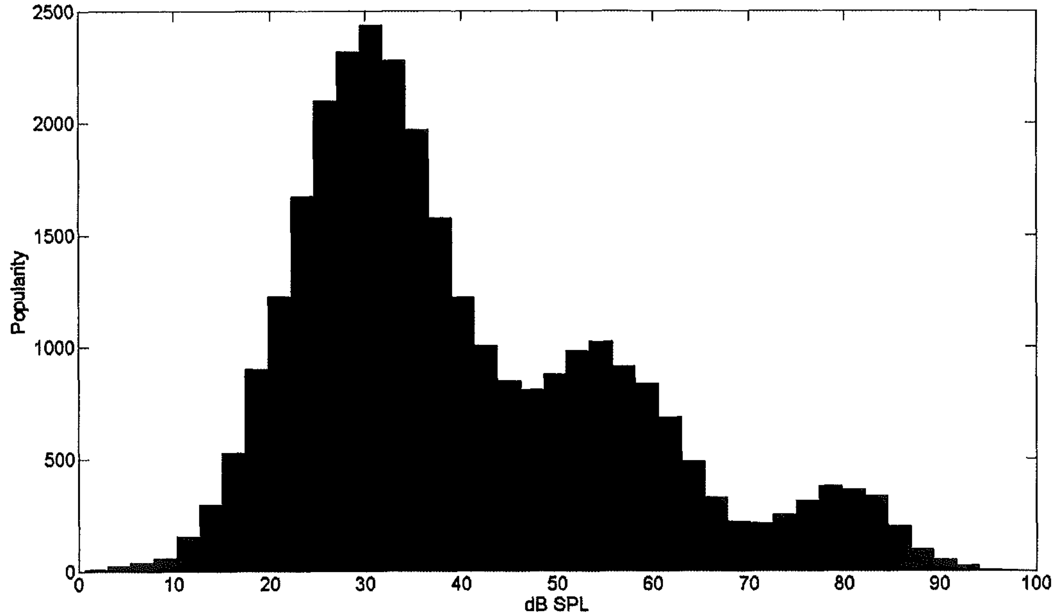
FIG. 11 is a second example histogram.

Now consider a second example plot in FIG. 11. In this plot, we see that the rightmost peak (at about 80 dB SPL) is below 25% of the maximum peak height in the histogram (which occurs at about 30 dB SPL). However, the second-rightmost peak at about 55 dB SPL is above the 25% threshold. Therefore, it qualifies.

This latter aspect is required to avoid missing a peak when most of the file is unvoiced and also to avoid spuriously detecting a peak when some of the file is particularly loud. To handle the very rare case, for instance in very brief recordings, when there is no peak that meets the requirements, the dB SPL value representing the top sixty percent of data (everything above the fortieth percentile by loudness) is chosen as the "peak" value.

Next, we wish to see if the previously calculated low-frequency harmonic energy is high enough relative to the typical voiced value we calculated as the peak value. To do so, the module declares any smoothed low-frequency harmonic energy less than 17.5 dB down from the peak value to pass. In the two examples above, the peak values were 70 dB and 55 dB respectively. Therefore, the respective passing energy for identifying a frame as voiced would be 52.5 dB and 37.5 dB.

As a safeguard to make sure the peak value was not too low, there is also a test to see if this results in more than 90 percent of the frames passing. If this occurs, the 17.5 value is repeatedly decremented by one dB until either 85 percent or less of the frames pass, or until the dB value reaches 7 dB. The underlying assumption here is that all languages expected by the system will contain enough unvoiced sound (or enough silence due to breathing) that at least 10 to 15 percent of all frames should be unvoiced. Therefore, this test acts as a safeguard in case a suspiciously high number of frames pass the harmonic energy test.

Presence of Lower Harmonics

Though the harmonic energy test described just above is often a reliable indicator of pitched sounds, there are still some corner cases of sounds which can "fool" the test. Adding one or more lower harmonics tests increases the reliability of voicing detection. Generally speaking, in order to be perceived as pitched, a sound must contain either the first harmonic for a significant time duration, the second harmonic for a significant time duration, or several harmonics (generally the third to sixth) for a significant time duration. In the example here, with overlapping frames each 10 ms of 25 ms duration, a "significant" time duration is 55 ms. This duration might be adjusted to 30 milliseconds or more and satisfy the "significant time" criteria. For example, using four samples of 25 ms duration and 10 ms period, resulting in a 55 ms window, a harmonic of 30 ms centered in the 55 ms window and spanning the four frames would have a significant time duration across the four samples and would be likely to be detected. It is possible that a sound could pass the harmonic energy test above, but not meet one of these lower harmonics criteria.

The voicing module tests may include tests for some or all of the three situations. To help illustrate this, consider the following example. Again, the first through eighth harmonics are represented as rows, and time is represented as columns. In this case, a one represents that the harmonic peak was detected at all (regardless of magnitude) and a zero represents that no harmonic peak was detected.

| | T1 | T2 | T3 | T4 | T5 | T6 | T7 | T8 | T9 | T10 | T11 | T12 |
|---|---|---|---|---|---|---|---|---|---|---|---|---|
| 400 hz | 1 | 1 | 1 | 1 | 1 | 0 | 0 | 1 | 1 | 0 | 1 | 1 |
| 800 hz | 0 | 1 | 1 | 1 | 1 | 1 | 0 | 0 | 1 | 1 | 1 | 1 |
| 1200 hz | 0 | 0 | 0 | 1 | 1 | 1 | 1 | 0 | 0 | 0 | 0 | 0 |
| 1600 hz | 0 | 0 | 0 | 0 | 0 | 1 | 0 | 0 | 0 | 0 | 0 | 0 |
| 2000 hz | 0 | 0 | 1 | 1 | 1 | 0 | 1 | 0 | 0 | 0 | 0 | 0 |
| 2400 hz | 0 | 0 | 1 | 1 | 1 | 1 | 1 | 0 | 0 | 0 | 0 | 0 |
| 2800 hz | 0 | 0 | 0 | 0 | 0 | 0 | 0 | 0 | 0 | 0 | 0 | 0 |
| 3200 hz | 0 | 0 | 0 | 0 | 0 | 0 | 0 | 0 | 0 | 0 | 0 | 0 |

First lower harmonic test: This test is a streak test. The first harmonic is present and occurs in a streak of at least four consecutive frames where the first harmonic is present. For the example, the following frames pass this test:

| | T1 | T2 | T3 | T4 | T5 | T6 | T7 | T8 | T9 | T10 | T11 | T12 |
|---|---|---|---|---|---|---|---|---|---|---|---|---|
| 400 hz | 1 | 1 | 1 | 1 | 1 | 0 | 0 | 1 | 1 | 0 | 1 | 1 |
| Pass? | 1 | 1 | 1 | 1 | 1 | 1 | 0 | 0 | 0 | 0 | 0 | 0 |

Second lower harmonic test: Similar to the first streak test, the second harmonic is present. Additionally, the current frame occurs in a streak of at least four consecutive frames where the second harmonic is present. For the example, the following frames pass this test:

| | T1 | T2 | T3 | T4 | T5 | T6 | T7 | T8 | T9 | T10 | T11 | T12 |
|---|---|---|---|---|---|---|---|---|---|---|---|---|
| 800 hz | 0 | 1 | 1 | 1 | 1 | 1 | 0 | 0 | 1 | 1 | 1 | 1 |
| Pass? | 0 | 1 | 1 | 1 | 1 | 1 | 0 | 0 | 1 | 1 | 1 | 1 |

Third lower harmonic test. This test is a harmonic consistency streak test. Considering the third through sixth harmonics in the frame, at least sixty percent of these harmonics are present. The harmonics tested and the threshold can be adjusted while still testing for harmonic consistency. Additionally, the current frame occurs in a streak of at least four consecutive frames that pass this test. For the example, the following frames pass this test:

| | T1 | T2 | T3 | T4 | T5 | T6 | T7 | T8 | T9 | T10 | T11 | T12 |
|---|---|---|---|---|---|---|---|---|---|---|---|---|
| 1600 hz | 0 | 0 | 0 | 0 | 0 | 1 | 0 | 0 | 0 | 0 | 0 | 0 |
| 2000 hz | 0 | 0 | 1 | 1 | 1 | 0 | 1 | 0 | 0 | 0 | 0 | 0 |
| 2400 hz | 0 | 0 | 1 | 1 | 1 | 1 | 1 | 0 | 0 | 0 | 0 | 0 |
| Pass? | 0 | 0 | 0 | 1 | 1 | 1 | 1 | 0 | 0 | 0 | 0 | 0 |

In order to pass the test for the presence of lower harmonics in a given frame, at least one of these three tests must pass. Therefore, combining the above tests, we see that the following frames pass:

| | T1 | T2 | T3 | T4 | T5 | T6 | T7 | T8 | T9 | T10 | T11 | T12 |
|---|---|---|---|---|---|---|---|---|---|---|---|---|
| $1^{st}$ harmonic pass? | 1 | 1 | 1 | 1 | 1 | 1 | 0 | 0 | 0 | 0 | 0 | 0 |
| $2^{nd}$ harmonic pass? | 0 | 1 | 1 | 1 | 1 | 1 | 0 | 0 | 1 | 1 | 1 | 1 |
| High harmonics pass? | 0 | 0 | 0 | 1 | 1 | 1 | 1 | 0 | 0 | 0 | 0 | 0 |
| Any pass (OR)? | 1 | 1 | 1 | 1 | 1 | 1 | 1 | 0 | 1 | 1 | 1 | 1 |

Pitch Stability

The next test is a pitch streak test that determines if the pitch is stable enough to indicate voicing. Adding this test is useful, because certain unvoiced data might appear to be voiced when using only the other two tests. In certain cases, lower harmonics and high amounts of harmonic energy may be present, but that may only occur because the pitch is rapidly changing in such a way as to capture this energy on an individual frame level. (This would occur because the original pitch detection algorithm tries to find any pitch that could place the loudest peaks in a harmonic series.) Such unstable pitch data does not represent voicing. Thus, a test to ensure frequency stability is useful.

This test takes into account that certain segments of stable, valid pitch may occur next to segments of unstable, invalid pitches. The key difficult question: if there is a large pitch transition, is it better to label the earlier or later frame as unstable, or both? In practice, unstable pitch occurs both before and after voiced, stable pitch. What we found works well is to declare pitch of a given frame to be stable if it participates in any five-frame segment whose maximum pitch difference versus time is 1.5 midi units. (This value of 1.5 is called the "midi stability" distance. Another predetermined midi stability criteria or pitch difference criteria can be chosen, as can another predetermined streak length greater or less than 50 ms.)

That is, even if all frames to the left of a given frame vary wildly, the frame may be declared stable if all four frames to its right are stable, and vice versa. To help illustrate this, we provide a new example, which does not continue the examples above. Below we show the midi pitch estimate values for several frames. (We recall that to convert to midi value M from a pitch estimate H in Hz, we calculate M=12*log 2(H/440)+69.)

| T1 | T2 | T3 | T4 | T5 | T6 | T7 | T8 | T9 | T10 | T11 | T12 | T13 |
|---|---|---|---|---|---|---|---|---|---|---|---|---|
| 71.0 | 60.3 | 58.9 | 60.1 | 60.2 | 59.9 | 65.4 | 74.1 | 55.5 | 54.8 | 55.6 | 72.0 | 59.1 |

The following frames pass this pitch streak test:

| T1 | T2 | T3 | T4 | T5 | T6 | T7 | T8 | T9 | T10 | T11 | T12 | T13 |
|---|---|---|---|---|---|---|---|---|---|---|---|---|
| 0 | 1 | 1 | 1 | 1 | 1 | 0 | 0 | 0 | 0 | 0 | 0 | 0 |

In theory, a file that contained a string of five pitch-stable frames followed by a jump to five pitch-stable frames followed by a jump to five pitch-stable frames etc. would be labeled as entirely pitch stable. However, the occurrence of five consecutive stable frames during unvoiced data is very unlikely. The occurrence of five consecutive stable frames with the other two tests passing is extremely rare.

Although the above pitch modules and this pitch stability processing perform well, there is an occasional "frequency burp" for a single frame, generally due to an anomaly in the pitch streak matching algorithm. In such cases, there may be a jump up by a large interval and then a jump back down in the next frame. If there is a jump up and then a jump back down that brings the final pitch to within twice the midi stability distance from the first pitch, then the frequency burp is forgiven, and the pitch stability test passes. We illustrate this with a new example, where we list the midi pitch estimate for each frame, and then show whether each frame would pass. We observe that the third frame shown here is "forgiven."

| T1 | T2 | T3 | T4 | T5 | T6 | T7 | T8 |
|---|---|---|---|---|---|---|---|
| 71.0 | 72.0 | 80.0 | 74.0 | 75.0 | 76.0 | 79.0 | 58.1 |
| 1 | 1 | 1 | 1 | 1 | 1 | 0 | 0 |

Combining Tests

At this point, the voicing module has data from three tests: sufficient harmonic energy, presence of lower harmonics, and pitch stability. In one embodiment, for a given frame to pass overall, all three tests are passed. A new example is shown here:

| | T1 | T2 | T3 | T4 | T5 | T6 | T7 | T8 | T9 | T10 |
|---|---|---|---|---|---|---|---|---|---|---|
| Harmonic Energy: | 1 | 1 | 1 | 1 | 1 | 1 | 1 | 1 | 1 | 0 |
| Lower Harmonics: | 0 | 1 | 1 | 1 | 1 | 1 | 1 | 0 | 1 | 1 |
| Pitch Stability: | 1 | 0 | 1 | 1 | 1 | 1 | 1 | 0 | 1 | 0 |
| Overall: | 0 | 0 | 1 | 1 | 1 | 1 | 1 | 0 | 1 | 0 |

Post-Processing

Once the frame-level final voicing decisions have been made above, there may be some isolated frames that were in disagreement with their neighbors. Voicing may have falsely triggered for a few frames, or falsely failed to trigger for others. We have found that eliminating voicing or non-voicing streaks of certain short lengths can be beneficial in reducing such errors. Thus, the module applies a voicing streak test to eliminate any voicing streak of fewer than 5 frames (though this parameter is user selectable) by setting the vu_decision value to zero. As an example, the raw decision data and resulting post-processed data, after this step, are:

| T1 | T2 | T3 | T4 | T5 | T6 | T7 | T8 | T9 | T10 | T11 | T12 | T13 |
|---|---|---|---|---|---|---|---|---|---|---|---|---|
| 1 | 1 | 1 | 1 | 1 | 0 | 1 | 1 | 1 | 0 | 1 | 1 | 0 |
| 1 | 1 | 1 | 1 | 1 | 0 | 0 | 0 | 0 | 0 | 0 | 0 | 0 |

Finally, and only after the previous step, the module eliminates any non-voicing decision of fewer than 3 frames by setting the vu_decision value to one. As an example, the data input and resulting vu_decision values are:

| T1 | T2 | T3 | T4 | T5 | T6 | T7 | T8 | T9 | T10 | T11 | T12 | T13 |
|---|---|---|---|---|---|---|---|---|---|---|---|---|
| 1 | 1 | 1 | 1 | 1 | 0 | 0 | 1 | 1 | 1 | 1 | 1 | 0 |
| 1 | 1 | 1 | 1 | 1 | 1 | 1 | 1 | 1 | 1 | 1 | 1 | 0 |

At this point, there is a voicing decision for every frame in the file and the module has completed its task.

Generalization of Voicing Detection

Voicing detection principles can be applied to a variety of methods and devices and may be embodied in articles of manufacture. A method of voicing detection can be applied to a series of frames that represent sound including voiced and unvoiced passages. One method includes processing electronically a sequence of frames that include at least one pitch estimate per frame and one or more magnitude data per frame for harmonics of the pitch estimate. Alternatively, the pitch estimate and magnitude data can be derived from more basic input. The method further includes filtering the sequence of frames for harmonic energy that exceeds a dynamically established harmonic energy threshold. This filtering includes calculating a sum per frame that combines at least some of the magnitude data in the frame. It includes dynamically establishing the harmonic energy threshold to be used to identify frames as containing voiced content and identifying frames as containing voiced content by comparing the calculated sum per frame to the dynamically established harmonic energy threshold. The method includes outputting data regarding voice content of the sequence of frames based on at least the identification of frames by the filtering for harmonic energy.

A further aspect of this method includes, prior to calculating sums per frame, excluding from the calculation any magnitude data that have a frequency outside a predetermined frequency band. This exclusion may either be in a choice of data delivered to the method or as a component of the method. The sum per frame may be calculated using the magnitude squared from the input magnitude data.

As part of voicing detection, a smoother may be applied to the calculated sums per frame.

The dynamically established harmonic threshold may be adjusted if a rate at which the frames identified as containing voiced content exceeds a predetermined pass rate. If too many frames pass, the harmonic energy threshold may be adjusted to make it more difficult to pass. After adjusting the harmonic energy threshold, the method proceeds with reevaluating the calculated sums per frame against the adjusted dynamically established harmonic energy threshold.

A further aspect of this method may include dynamically establishing the harmonic energy threshold by estimating a frequency distribution of occurrences at particular magnitudes across magnitudes present in the magnitude data. The dynamically establishing continues with identifying from the frequency distribution a maximum peak with the highest energy of occurrence and other peaks in frequency of occurrence. It further includes identifying a threshold peak by qualifying the maximum peak and those other peaks that are at least a predetermined height in relation to the maximum peak and choosing the qualified peak of the greatest harmonic magnitude and setting the harmonic energy threshold to the magnitude of the chosen other peak. This dynamically established harmonic energy threshold is then used in detection of voicing.

Some corner cases of frames with substantial harmonic energy that do not represent voiced content can be addressed by evaluating the presence of one or two base harmonics and the presence of extended harmonics outside the base harmonic range. In one embodiment, the method further includes identifying frames belonging to streaks of successive frames with base harmonics present. The base harmonics are those within a predetermined range of the pitch estimate. For instance, the first and second harmonics. The presence of these harmonics in the frame is based on evaluating magnitude data for the harmonics. Streaks include successive frames in which the base harmonics are determined to be present. Successive frames are not considered to constitute a streak unless the base harmonics are present for a number of frames that equals or exceeds a predetermined base harmonics streak length. The method continues with outputting data regarding voiced content of the sequence of frames based on at least the identified frames that pass the filtering for harmonic energy and that belong to streaks that exceed the predetermined base harmonics streak length. This method for filtering out corner cases can stand on its own or be applied in conjunction with filtering for harmonic energy, qualified filtering for harmonic energy and/or adjusting the dynamically established harmonic energy threshold if a pass rate is exceeded.

Additional corner cases can be addressed by evaluating the presence of extended harmonics, above the one or two base harmonics. The presence of one or more base harmonics or the presence of a plurality of extended harmonics can be used to determine whether the total harmonic energy in a frame is really indicative of voiced content.

Additional corner cases can be addressed by evaluating the streaks of successive frames for pitch stability, because voiced content tends to have greater stability than random noise. For instance, a gradually rising or descending passage of singing or humming will not have the random rises and falls of background noise. This method of evaluating streaks of successive frames for pitch stability includes determining whether pitch estimates for frames in subsequences of a predetermined sequence length exhibit pitch stability among the frames within a predetermined pitch stability range retained those frames exhibiting pitch stability as having voiced content. Optionally, a single frame deviation beyond the pitch stability range may be determined to be forgivable based on pitch stability when it is a single frame in a streak that includes both frames before the single frame and frames after the single frame. The pitch stability range criteria may be relaxed so that the single frame is forgiven if the immediately following frame is within a multiple of the predetermined pitch stability range. The method further includes outputting data reflects the evaluating of pitch stability.

Determination of pitch stability can be further enhanced by filtering out of the identified frames any frames belonging to short streaks of identify frames that are not part of a streak of successive frames that equals or exceeds a predetermined identified frame streak length.

Corresponding to the methods are a variety of electronic signal processing components.

One voicing detection component includes an input port, first filtering component and an output port. The input port is adapted to receive electronically a stream of data frames including at least one pitch estimate per frame. Alternatively, the input port can receive more basic data and derive the pitch estimate from the basic data. The first filtering component calculates a sum per frame, dynamically establishes a harmonic energy threshold, and identifies frames containing voiced content by comparing the calculated sum with the threshold. The calculated sum represents a combination of at least some of the magnitude data in the frame. The harmonic energy threshold is dynamically established based on harmonic energy distribution across a plurality of identified frames. Frames are identified as containing voiced content by comparing the calculated sum per frame to the dynamically established harmonic energy threshold. The output port coupled to the filtering component is operative to output data regarding voiced content of the sequence of frames based on at least the identification of frames by the first filtering component.

In combination with the first filtering component, second filtering component, operative before the first filtering component, can be applied to exclude from the sum per frame any magnitude data that have a frequency outside a predetermined frequency band. This reduces the impact of the higher order harmonics of a fundamental frequency. A smoother component optionally may operate on the calculated sums per frame, coupled between the first filtering component and the output port.

As a further aspect, the first filter component may include logic to readjust the dynamically established harmonic energy threshold. This logic may determine if a rate at which frames are identified as containing voiced content exceeds a predetermined pass rate. It adjusts the harmonic energy threshold to reduce the rate at which frames pass and repeats the comparison of the calculated sum per frame against an adjusted dynamically established harmonic energy threshold.

In some embodiments, the first filtering component includes logic to dynamically establish the harmonic energy threshold that estimates a frequency distribution, identifies peaks in the frequency distribution, selecting one peak as the maximum peak and qualifying others as being of a predetermined relation in height to the maximum peak. It chooses the peak of the greatest harmonic magnitude from among the qualified peaks and sets the harmonic energy threshold at the magnitude of the chosen peak.

One or more streak identification subcomponents may be coupled to the first filtering component. One subcomponent identifies frames belonging to streaks of successive frames with base harmonics present. Another subcomponent that optionally may be combined with identifying streaks of successive frames with base harmonics present tests, alternatively, for the presence of extended harmonics. The logic of the streak identification subcomponents follows the methods described above. Each of the streak identification subcomponents sense data regarding voiced content of the sequence of frames to the output port data. This data is based on at least the identified frames the pass both filtering for harmonic energy and one of the streak length criteria.

Signal processing components for detecting voicing also may be described in terms of means and functions, relying on the more detailed technical descriptions given above. A further embodiment of a signal processing component may include an input port adapted to receive a stream of data frames including at least one pitch estimate per frame. It further includes first filtering means for identifying frames as containing voiced content by comparing a calculated sum per frame to a dynamically established harmonic energy threshold. It includes an output port coupled to the first filtering means that outputs data regarding voiced content of the sequence of frames based on at least the identification of frames by the first filtering means.

This means plus function component further may include base harmonic presence means and, optionally extended harmonic presence means. These harmonic means are coupled to the filtering means in the output port and, when both present, work cooperatively. These means identify frames belonging to streaks of successive frames with base or extended harmonics present, respectively. Base harmonics are those harmonics within a predetermined range of the pitch estimate. Extended harmonics are outside the predetermined range. The presence means identify streaks having harmonics present in successive frames that equal or exceed a predetermined harmonics streak length.

This component further may include a pitch stability means and/or a short streak exclusion means. Both are coupled before the output. The pitch stability means is for evaluating the streaks of successive frames for pitch stability and passing the results of the evaluating to the output port. The short streak exclusion means is for filtering out of the identified frames any frames belonging to short streaks of identified frames that are not part of a streak of successive frames that equal or exceed a predetermined identified frame streak length.

As with other methods disclosed, we disclose a computer readable storage medium including program instructions for carrying out voicing detection methods. Variations on this computer readable storage medium are as described above in the context of pitch detection and as further described below.

Module to Retain Only Voiced Harmonic Peaks

At this point, the system has data indicating which frames are judged to be voiced and which are judged to be non-voiced. It also has data indicating the magnitudes of harmonics for each frame, whether those frames are voiced or not. This module sets to zero all harmonic magnitude data that occurs in frames judged to be unvoiced.

Module to Detect Vibrato

In many music transcription systems, the ultimate goal is to obtain a musical representation that could be played on an instrument such as a piano, where there are discrete pitches. A piano has keys that represent twelve pitches per octave, while the human voice can sound any pitch continuously within an octave. This leads to a number of challenges in automatic music transcription, including how to deal with vibrato.

Vibrato is a performance technique where a singer or instrumentalist uses oscillations of pitch (and sometimes amplitude) on one or more notes, usually for musical expression. Musicians understand these oscillations to be ornamentation or stylization of what should be transcribed or notated as a single pitch. (This single pitch need not be on a Western twelve tone scale such as on a piano; the key point is that there is a single pitch.) An automatic transcription system that is unaware of vibrato, however, might transcribe these oscillations as alternations between pitches, sometimes referred to as trills. Musically, vibrato and trills are very different. Therefore, a system that confuses these two phenomena should be considered erratic. Conversely, a system that can detect vibrato accurately, and use this information to indicate single pitches where appropriate, should be considered accurate.

The goal of this module is to accurately detect vibrato. This way, single pitches containing vibrato will be transcribed as single pitches, not as alternating pitches. A second benefit comes in the area of syllable detection. Because vibrato also tends to include amplitude variation, we can prevent spurious syllable detection by knowing when vibrato occurs. Just as the final transcription will know not to trigger new pitches during a single pitch vibrato segment, it will also know not to trigger new syllables there.

Figure 4:
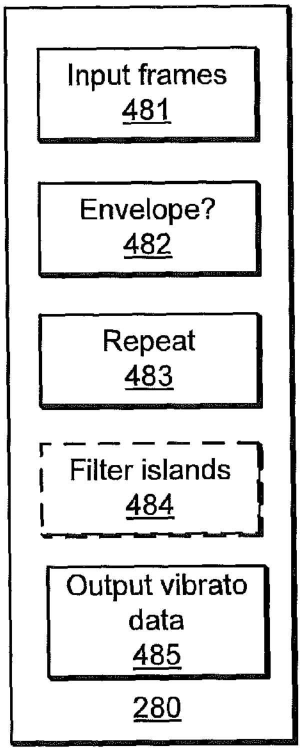
FIG. 4 is a high level block diagram of the vibrato detection module.

FIG. 4 is a high level block diagram of the vibrato detection module 280, which includes two sub-modules. The first one 282, 283 detects vibrato over what we term a vibrato window of a number of frames. We call this sub-module the frame-level detector. Next, the second module, the vibrato post-processor sub-module 284, takes the data from the frame-level detector and outputs a decision that specifies continuous regions of frames during which vibrato is detected. We next describe each sub-module in detail.

Frame-Level Detector Sub-Module

The means for frame level vibrato detection uses as input or derives from more basic inputs:

The pitch detected at each frame, and

A binary indicator of whether voicing has been detected at each frame.

It outputs: a frame-level binary indicator of whether vibrato was detected in the region beginning on a given frame.

When detecting vibrato, the following observations are particularly useful: 1)

When the pitch oscillations occur at a certain rate ("pulses per second"), they tend to sound like vibrato. 2) When the pitch range of the oscillations has a certain distance between local maxima and minima, ("pitch depth") they tend to sound like vibrato. 3) When the pitch oscillations follow a sinusoidal trajectory (such as represented by the elementary sin( ) and cos( ) trigonometry functions), as opposed to a square or other wave trajectory, they tend to sound like vibrato.

Figure 12:
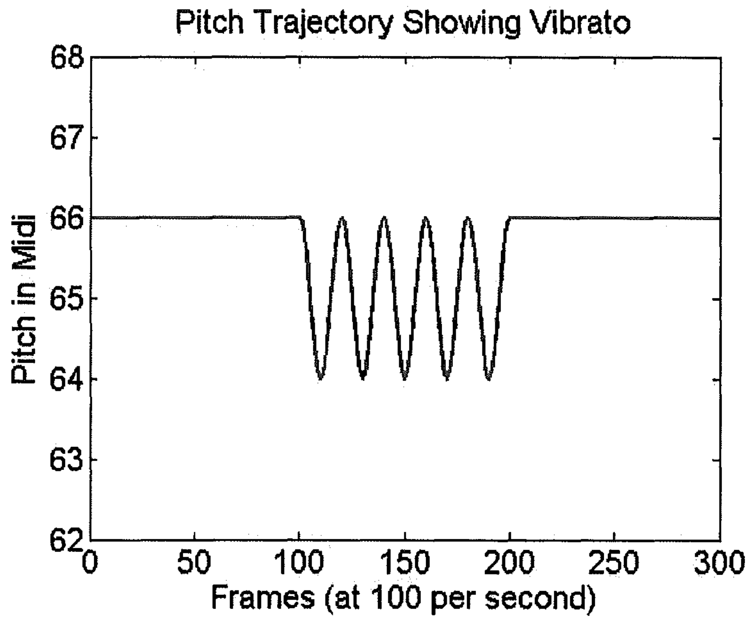
FIGS. 12-13 depict an idealized example of a pitch trajectory containing vibrato.
Figure 13:
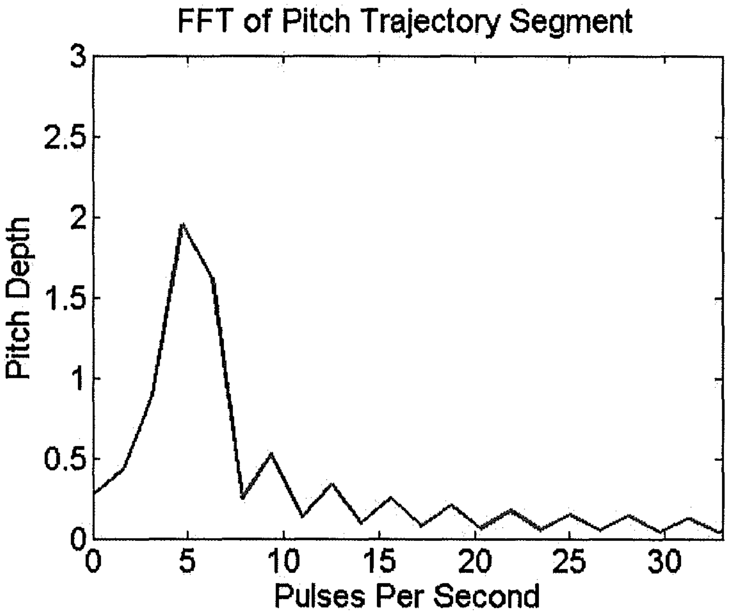

To help illustrate the three features mentioned here, FIGS. 12-13 depict an idealized example of a pitch trajectory containing vibrato. In FIG. 12, vibrato occurs in frames 101 through 200, which corresponds to 100 time frames or one second. First, we see that in this one second segment, there are 5 pulses, or 5 pulses per second. Second, we see that the distance between the highest and lowest pitch in this segment or pitch depth is 2 midi units. Third, we see that the overall shape of the pitch trajectory in these frames is highly sinusoidal; we will introduce a quantitative measure of in FIG. 3.

We find that taking the FFT (fast Fourier transform) of the pitch trajectory over a local time window is a good tool for estimating all three of these quantities. Because the FFT may be thought of as a sinusoidal oscillation detector, it is a good tool to use to detect vibrato. Below, we will employ the FFT, along with a set of requirements on the data found in the FFT, to detect vibrato.

Before moving on, we make two notes. First, we deliberately avoid use of the word "frequency" when discussing vibrato, because this word has triple meaning. It could possibly refer to pulses per second, pitch depth, or pitch. Second, though there are magnitude-based cues to vibrato that often co-occur with pitch oscillations, we found pitch to be much more reliable.

Experiments Informing this Sub-Module

Figure 14:
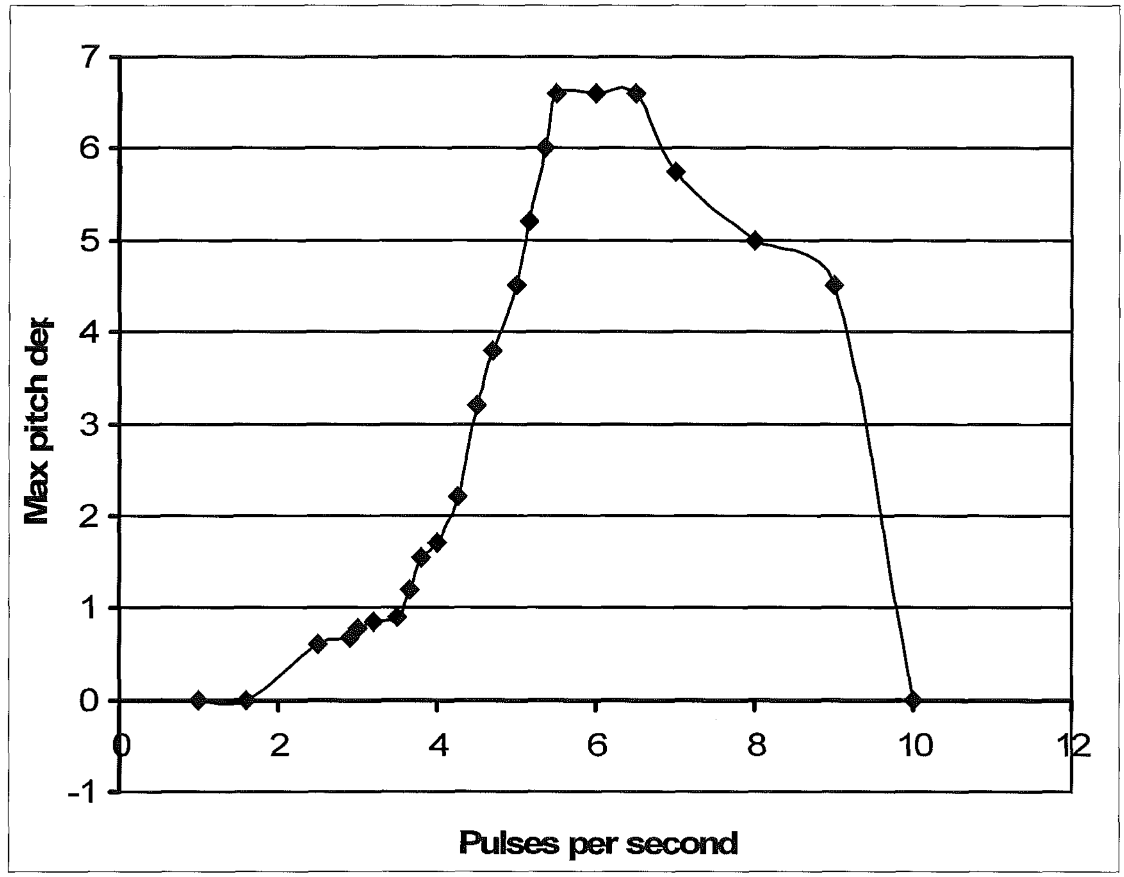
FIG. 14 is a graph of the perceived vibrato envelope showing that the ranges of pitch depth and pulses per second must be considered together to model an envelope of what users perceive as vibrato.

We conducted semi-formal psychoacoustcal experiments to determine (based on one trained listener) what combination of pulses per second and pitch depth would be perceived as vibrato. Though other researchers have claimed that vibrato occurs within fixed, independent ranges of these variables, we found that this is not a sufficient model to predict when a human listener would hear vibrato. Our experiments have shown that the ranges of pitch depth and pulses per second must be considered together to model an envelope of what users perceive as vibrato, as illustrated in FIG. 14. Specifically, oscillations with large pitch depth will only be perceived as vibrato if the number of pulses per second is also high. Using large pitch depth with a low number of pulses per second results in what a listener is likely to describe as an alternating note sound. For example, oscillations with a pitch depth of 3 midi units (semitones) will be perceived as pitch alternations rather than vibrato if there are only 4 pulses per second; at 5 pulses per second however, the oscillations will be perceived as vibrato. Though the values of pitch depth and pulses per second are in general correlated, the relationship is very nonlinear and is best specified below, in a table of empirical results. To obtain this table, we prepared several sets of synthetic harmonic signals with prescribed pitch depth and pulses per second. We also varied the central pitch and included amplitude variations, though we found these to have substantially less effect on the perception of vibrato.

FIG. 14 is a graph of the perceived vibrato envelope tabulated below. In the table, the number of pulses per second is shown in the first column, and the corresponding maximum pitch depth (in semitones or midi units) that will be perceived as vibrato is shown in the second column. The envelope that corresponds to the table is plotted in FIG. 14.

| Pulses per Second | Maximum Pitch Depth |
|---|---|
| 1.0 | 0.0 |
| 1.6 | 0.0 |
| 2.5 | 0.6 |

-continued

| Pulses per Second | Maximum Pitch Depth |
|---|---|
| 2.9 | 0.67 |
| 3.0 | 0.78 |
| 3.2 | 0.85 |
| 3.5 | 0.9 |
| 3.65 | 1.2 |
| 3.8 | 1.55 |
| 4.0 | 1.7 |
| 4.25 | 2.2 |
| 4.5 | 3.2 |
| 4.7 | 3.8 |
| 5.0 | 4.5 |
| 5.15 | 5.2 |
| 5.35 | 6.0 |
| 5.5 | 6.6 |
| 6.0 | 6.6 |
| 6.5 | 6.6 |
| 7.0 | 5.75 |
| 8.0 | 5.0 |
| 9.0 | 4.5 |
| 10.0 | 0.0 |

It can be observed that in general, faster vibrato (more pulses per second) allows for larger pitch depth, though this trend reverses when vibrato exceeds about 6.5 pulses per second. When an oscillation of greater pitch depth than the maximum occurs with the given pulses per second, it tends to sound like a trill or a rapidly repeated note rather than vibrato. Hence, the maximum pitch depth may be thought of as a ceiling. There is also a floor. If there is slight oscillation in pitch, but that oscillation has very little pitch depth, then the pitch will be perceived as stable and lacking in vibrato. In the sub-module, there are measures described below to prevent vibrato from triggering in such situations.

Method of Sub-Module

We now return to a discussion of the sub-module's procedures. The sub-module begins with an optional smoothing of the input pitch track 281. We used a 90 millisecond (or nine frame) Hamming window to smooth, though other smoothers (such as a Kaiser or Blackman window, using a length of 50 ms to 130 ms) may be used. It is generally well-advised to apply the smoother. The frame-level pitch data is prone to errors introduced by FFT bias, so smoothing can produce more accurate pitch estimates. These improved pitch estimates are less likely to contain outlier values that spoil the sinusoidal nature of the pitch trajectory that indicates vibrato.

The next major step in the sub-module 282 is to take an FFT of segments of the pitch trajectory. In a sense, it is like taking a spectrogram, except that the input data is the pitch trajectory rather than the raw audio data. As mentioned above, the goal here is to use the FFT to obtain estimates of the pulses per second, pitch depth, and sinusoidal nature of any potential vibrato. We may think of the FFT as a sinusoid detector where sinusoids of frequency F and peak-to-peak magnitude M show up as FFT peaks of height M at frequency index F. Therefore, a pitch trajectory with P pulses per second and pitch depth D should show up in an FFT of the pitch trajectory as peaks of height D at frequency index P. To help illustrate this, in FIG. 13, we include the FFT (formed using the procedure and parameters described below) for the first 32 frames of the vibrato (frames 101 through 132) shown in FIG. 12.

The sub-module considers a hopped vibrato window of length <<vibrato window>>, which we chose as 32 frames or 320 ms. That is, it takes a buffer of the input pitch track values of length <<vibrato window>> starting at frame one, then considers another such buffer starting <<vibrato hop>> frames ahead, which we chose as 2 frames or 20 ms later. There is some latitude in choosing the hop count, e.g., from 10 ms to 30 ms, or 1 to 3 frames of 10 ms spacing. The <<vibrato window>> value represents a tradeoff between (1) choosing a window long enough to catch sufficient cycles of slow vibrato and (2) choosing a window short enough to catch vibrato that occurs for only a brief amount of time or during a short note. For each vibrato window the sub-module does the following:

- Subtracts off the median value. Though the mean is often removed in FFT processing, we deliberately remove the median. This is done in case there is vibrato for most of the vibrato window duration, but there is also a stronger change of pitch at one end. This way, the vibrato pitch will be centered about zero with transitional values deviating from zero. Such deviations will be detected as transitional in steps below.
- Applies a frame-level window to the frames in the buffer. We found that the time domain windows typically used in audio signal processing (such as the Hamming window) tended to make certain inputs appear more sinusoidal and vibrato-like than they actually were. (Note that using a 90 ms 9-frame window above did not represent too much smoothing.) Thus, we chose to use a simple rectangular window.
- Takes a zero-padded FFT. We used a 64 sample FFT for the 32 frame input, though additional zero padding could also be used.
- Scales the FFT by a factor of 4. A typical FFT represents a sinusoid from −1 to +1 with a normalized FFT magnitude coefficient of 0.5. In our case, a sinusoid from −1 to 1 represents a total midi swing of 2.0 midi units. Therefore, we must multiply the magnitude FFT by 4.
- Finds all peaks in the FFT. Peaks in an FFT of a time-windowed pitch track indicate oscillations in the pitch track. Such oscillations tend to indicate vibrato, so it is important to record the magnitude and frequency of the peaks.
- Determine the number of peaks in the FFT. If there are no peaks, then no significant oscillations have been detected, and therefore no vibrato can be detected.
- If there is at least one peak in the FFT, do the following to see if the data for the peak indeed suggests vibrato.
- Perform a quadratic interpolation of the highest magnitude peak in the FFT. By examining the "FFT frequency axis" (labeled the "Pulses Per Second" axis on the plot above) value for the peak, we obtain an estimate for the rate of pulses per second, $\hat{r}$. By examining the "FFT magnitude axis" (labeled the "Pitch Depth" axis on the plot above) value for the peak, we obtain an estimate for pitch depth, $\hat{d}$. This is because a peak in this FFT domain represents oscillations that tend to characterize vibrato. Because we use the FFT peak to obtain pulses per second and pitch depth estimates, we now have data that may be compared with our experimentally obtained table of these quantities described above. (This is done just below.) Regarding storage of values, we note that the value for estimated pulses per second, $\hat{r}$ is stored in an array, as this quantity will be needed in post-processing. Also, the module stores the value corresponding to the vibrato window in the first frame of the window.
- Calculate the ratio of the estimated pitch depth to the mean of the FFT magnitude. This gives us an idea of "how prominent" the peak is in the FFT. We call this the relative_peak_magnitude. More formally, with P(k) indicating the K-point FFT of the pitch segment:

$$\text{relative\_peak\_magnitude} = \frac{\hat{d}}{\frac{1}{K}\sum_{k=0}^{K-1} P(k)}$$

Calculate the ratio of the "maximum pitch depth" perceived as vibrato to the estimated pitch depth $\hat{d}$, using the estimated pulses per second $d_{max}(\hat{r})$ according to the table shown above. We call this the ceiling_peak_ratio.

$$\text{ceiling\_peak\_ratio} = \frac{d_{max}(\hat{r})}{\hat{d}}$$

We note that in order for a peak to correspond to data whose pitch depth falls below the maximum, this ratio must be at least 1.0.

If there are two or more peaks in the FFT, perform a quadratic interpolation on the second peak much as we did on the first. Then, calculate the ratio of the estimated pitch depth that we obtained for the highest peak to this magnitude (representing a second estimated pitch depth, $\hat{d}_2$). We call this quantity the top_peak_ratio:

$$\text{top\_peak\_ratio} = \frac{\hat{d}}{\hat{d}_2}$$

In typical vibrato, this quantity will be high, because there should be only one FFT peak if the oscillations are truly sinusoidal, as most vibrato is. Non-sinusoidal oscillations such as square waves or triangle waves tend not to sound like vibrato, and are also characterized by additional significant peaks. Therefore, their top_peak_ratio value will be low. This is the test of sinusoidal nature that we alluded to above.

Using the pitch track values in the vibrato window, calculate the total "pitch swing" that occurs in the vibrato window, meaning the difference between the maximum and minimum values of the pitch track p therein. Then calculate the ratio of the estimated pitch depth to the total pitch swing. We call this quantity swing_covered_by_peak:

$$\text{swing\_covered\_by\_peak} = \frac{\hat{d}}{\max(p) - \min(p)}$$

This quantity will be useful in post-processing, so it is also stored in an array, with the swing_covered_by_peak value stored in the frame corresponding to the first frame of the vibrato window. Ideally, for cases of vibrato, a large amount of the swing is explained by (covered by) the peak. This is because the peak represents the amount of constant-pulses per second sinusoidal energy in the signal.

Calculate the ratio of the maximum allowable pitch depth given in the table for the estimated pulses per second to the total pitch swing. We call this quantity the ceiling_swing_ratio:

$$\text{ceiling\_swing\_ratio} - \frac{d_{max}(\hat{r})}{\max(p) - \min(p)}$$

Keeping in mind that a substantial magnitude value at the zero frequency FFT bin (the "DC component") represents a median that differs from the mean of the pitch track (and thus likely shows a pitch change rather than vibrato, as explained above), record the FFT's first bin (zero frequency) value, which we call the zero_freq_val. Using the FFT notation above, we may write this as P(0) for bin k=0 representing frequency zero. Also, calculate the ratio of the estimated pitch depth to the zero_freq_val. We call this the top_zero_freq_ratio:

$$\text{top\_zero\_freq\_ratio} = \frac{\hat{d}}{\text{zero\_freq\_val}} = \frac{\hat{d}}{P(0)}$$

This gives a representation of the detected vibrato size relative to any non-vibrato pitch change in the vibrato window. For most situations in which there are oscillations too small to be perceived as vibrato, there is either no peak detected above, or the top_zero_freq_ratio value is very small. This is how we meet the goal of preventing vibrato from falsely triggering.

Now, we have data for several variables that together can indicate the presence or absence of vibrato. There are two ways to pass the vibrato detection test. The first is for all of the following conditions to be met:

the ceiling_peak_ratio is at least 1.0
the ceiling_swing_ratio is at least 1.0
the swing_covered_by_peak is at least 0.6
the top_peak_ratio is at least 1.20
the top_zero_freq_ratio is at least 1.38, and
the zero_freq_val is less than 1.60.

The second way to pass the test is for the following alternate conditions to be met:

the ceiling_peak_ratio is at least 1.0
the swing_covered_by_peak is at least 0.5
the top_peak_ratio is at least 1.20*1.6
the top_zero_freq_ratio is at least 1.38*1.6, and
the zero_freq_val is less than 1.60*1.6.

In all cases, values for these parameters are user-selectable, though the given values worked well.

If either the regular or alternate conditions are met, then the output flag for detected vibrato is set for the first frame in the vibrato window, even though the entire vibrato window's data was needed to detect vibrato. We also keep in mind that if the hop size for the vibrato windows is anything other than 1, that there will not be consecutive vibrato detection flags in the output. To take such data and choose continuous regions of vibrato, rather than single frame flags, we will require the next sub-module, the vibrato post processor.

Vibrato Post-Processor Sub-Module

At this point, we have three outputs from the vibrato frame detection sub-module that will be used by the vibrato post-processor sub-module. These are:

A flag for each frame, indicating whether each frame represents the start of a vibrato window judged to have vibrato.

A record of the estimated pulses per second for each vibrato window.

A record of the swing_covered_by_peak value for each vibrato window.

Now, the vibrato post-processor sub-module 284 will use these data to determine which frames in the audio file contain vibrato. To do so, it will complete a few tasks. Specifically, we recall that each vibrato window is some number of frames long, for example 32 frames. The sub-module must determine how many of the 32 frames in any given vibrato window should be declared vibrato. Also, it must deal with ambiguous situations where there are vibrato windows with vibrato detected near or overlapping vibrato windows without vibrato detected.

The sub-module 284 performs the following steps:

First, islands of consecutive vibrato flags are identified from the output of the previous sub-module. (This is only relevant if the hop size is one frame in the previous module, because otherwise, all islands will be of length one.) For example, consider these output flags from the above vibrato detection module:

| | | | | | | | | | | | | | | | | | | | | | | | | | |
|---|---|---|---|---|---|---|---|---|---|---|---|---|---|---|---|---|---|---|---|---|---|---|---|---|---|
| 0 | 1 | 1 | 1 | 1 | 1 | 1 | 1 | 1 | 0 | 0 | 0 | 0 | 0 | 0 | 0 | 0 | 0 | 0 | 0 | 0 | 0 | 0 | 0 | 0 | |
| 0 | 0 | 0 | 0 | 0 | 0 | 0 | 0 | 0 | 0 | 0 | 0 | 0 | 0 | 0 | 0 | 1 | 1 | 1 | 0 | 0 | 1 | 1 | 1 | 1 | 1 |

We see three vibrato islands, of lengths 8, 3, and 5.

Next, the sub-module proceeds island by island with the first goal of determining how many of the several frames in the vibrato window deserve to be labeled as vibrato. (We recall that the vibrato analysis regions are, for example, 32 frames long, whereas the vibrato flag is only set to 1 for the first of those frames.) To make this decision, we use the swing_covered_by_peak value recorded by the previous sub-module. The logic here is that when the vibrato peak in the FFT explains the vast majority of the pitch deviation in the vibrato window, it leaves very little room for any non-sinusoidal or unstable activity. Therefore, such vibrato windows are assumed to be entirely sinusoidal, and all of the frames therein are assigned vibrato output flags. On the other hand, frames for which there is much pitch variation not explained by the vibrato peak should only be assigned vibrato output flags in the more central frames. To implement this rule, the leftmost and rightmost frame in each island is examined for its recorded swing_covered_by_peak value. For the leftmost frame, if the value is at the minimum allowed by the first test in the previous sub-module (0.6), then the vibrato output flags are assigned only ¼ of the vibrato window length to the left. (This is half way from the central sample to the start of the original vibrato window.) If the value of swing_covered_ by_peak is at the maximum of 1.0, then, then the vibrato output flags are assigned to fully ½ of the vibrato window length to the left. (This is all the way from the central sample to the start of the original vibrato window.) For values between 0.6 and 1.0, a linear interpolation is used. An entirely similar procedure is used for extending samples to the right. In all cases, the intermediate frames (those between frames extended to the left and right) in the island all receive new vibrato flags. We note that in the previous sub-module, vibrato flags were set at the beginning of a window, whereas here they are set from the central sample (center frame) of each window. (Safeguards are also followed here to make sure that vibrato flags are never written to frames before the start or after the end of a file.)

As an example, let's consider the first island (of length 8) in the example just above, and assume we are using 32 frame vibrato analysis windows. We first look at the swing_covered_ by_peak value for the island's leftmost frame (which is the second frame in the total sequence shown) and say we find this value is 0.9. In that case, we would include a vibrato indicator for 14 of the 16 frames on the left of the first vibrato window in the island, recalling that the 16 frames in question are the second through seventeenth frames in the example. In other words, only the first two frames of the vibrato window would not receive new flags. Now, we also check the swing_ covered_by_peak value for the island's rightmost frame (which is the ninth frame in the total sequence shown) and say we find this value is 0.6. In that case we would include a vibrato indicator for 8 of the 16 frames on the right of the last vibrato window. We recall that this time, the 16 frames in question begin on the twenty-fifth frame of the example, because that is the seventeenth frame of the last vibrato window in the first island. At the end of processing the first island, this is how the new vibrato flags appear:

| | | | | | | | | | | | | | | | | | | | | | | | | | |
|---|---|---|---|---|---|---|---|---|---|---|---|---|---|---|---|---|---|---|---|---|---|---|---|---|---|
| 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 |

At this point, we have a new set of vibrato islands, and we may have merged certain islands inadvertently through our expansion rule just described. While it is good to merge islands that are both indicating the same vibrato, it is undesired to merge islands indicating vibrato in different notes. For example, if there is a vibrato on the pitch C, and then vibrato on the pitch D one full tone above it, we do not wish to merge these two pitches into one; we merely wish to show two separate notes, each with vibrato. One proxy for whether this is the case is the number of consecutive vibrato windows in which no vibrato was detected. Hence, the next processing seeks to determine if the above expansion scheme resulted in merging islands that were previously more than 7 frames apart (though the parameter is user-selectable). It considers all islands that now exist after the expansion scheme, and sees if any of the islands overwrote any string of 8 or more originally non-vibrato frames. If this was the case, then the following rule is applied: set the middle one-third of the original non-vibrato frames to not indicate vibrato, but allow the outer thirds to continue to show vibrato. This compromise is chosen because some amount of expansion is still needed about the central frame in each vibrato window. We illustrate this with an example. Say that before island processing, this was the set of vibrato flags:

| | | | | | | | | | | | | | | | | | | | | | | | | | |
|---|---|---|---|---|---|---|---|---|---|---|---|---|---|---|---|---|---|---|---|---|---|---|---|---|---|
| 0 | 0 | 1 | 1 | 1 | 1 | 1 | 1 | 1 | 1 | 0 | 0 | 0 | 0 | 0 | 0 | 0 | 0 | 0 | 1 | 1 | 1 | 1 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

We see that there had been 9 non-vibrato frames. Say that after processing islands, the two islands were merged as follows (note the appearance of flags further to the right which reminds us of the change in indexing convention during after processing):

| | | | | | | | | | | | | | | | | | | | | | | | | | |
|---|---|---|---|---|---|---|---|---|---|---|---|---|---|---|---|---|---|---|---|---|---|---|---|---|---|
| 0 | 0 | 0 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 0 | 0 |

Now, we have overwritten a streak of nine zeros with ones. Therefore, we set the middle third to zero, noting that their location is shifted to the right by 16 frames (the center of the vibrato windows):

| | | | | | | | | | | | | | | | | | | | | | | | | | |
|---|---|---|---|---|---|---|---|---|---|---|---|---|---|---|---|---|---|---|---|---|---|---|---|---|---|
| 0 | 0 | 0 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 |
| 1 | 1 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 0 | 0 |

We see that we have prevented the merging of the islands.

Now, we have vibrato islands which have been expanded and possibly merged as a result, but also possibly forced apart by the most recent step. Presently, the goal is to determine if each island fully covers 1.28 or more sinusoidal cycles of vibrato. (The estimated number of cycles of vibrato is defined as the estimated pulses per second multiplied by the estimated number of seconds of vibrato.) Listening tests showed that only this many cycles were needed to give the impression of vibrato, but that fewer cycles did not sound like vibrato. Hence, vibrato islands containing fewer cycles than 1.28 should be cancelled. However this problem is non-trivial because the number of pulses per second is different for different vibrato islands. This is where the estimated pulses per second data from the previous sub-module become useful. For each vibrato island, the system calculates the median number of pulses per second using only the frames that were originally judged as containing vibrato by the previous sub-module (not the extensions.) It also considers the length of the current island. To determine the number of vibrato cycles while assuming a frame rate of 100 per second, we calculate (island length in frames)*(median estimated pulses per second)/100. If this quantity is at least 1.28, the sub-module records in the final vibrato output that vibrato was present. If this quantity is not at least 1.28, the sub-module deletes the island, thereby not showing vibrato during the frames in question. For example, if the island length is 40 frames, and the median estimated pulses per second is 4, then we obtain 40*4/100 or 1.6, which is greater than 1.28. Therefore, we would record that vibrato was present in these frames.

At this point, we have binary flags for each frame in the file indicating whether or not vibrato has been detected in that frame.

Generalization of Vibrato Detection

The disclosed principles of vibrato detection can be applied to a variety of methods, devices and articles of manufacture. One method of vibrato detection is applied to a series of detected pitches, beginning with processing electronically a sequence of the detected pitches for frames and estimating a rate and pitch death of oscillations in the sequence. It includes comparing the estimated rate and pitch death to a predetermined vibrato detection envelope and determining whether the sequence of detected pitches would be perceived as vibrato. The method repeatedly determines vibrato perception of successive sequences of frames and repeating the processing and comparing actions. It outputs data regarding whether the successive sequences would be perceived as vibrato.

In a further aspect, the estimating of the rate in pitch death of oscillations may include applying a zero-padded FFT to sequence the detected pitches, producing an FFT output including raw rate and pitch depth data for oscillations in the sequence. From the raw rate and pitch depth data, this further aspect includes interpolating the rate and pitch depth of oscillations centered on at least one peak in the FFT output to produce the estimated rate and pitch depth. One useful interpolation is a quadratic interpolation.

A useful method that can operate on its own or in connection with the methods described above is a method of excluding from vibrato perception those sequences of frames in which a plurality of peaks in the FFT output indicate a waveform that would not be perceived as vibrato. For instance, square waves, triangle waves, and sawtooth waves are not perceived as vibrato. Variations on sinusoidal waves are perceived as vibrato.

Also useful as a method of its own or in combination with the methods above is a method of excluding from vibrato perception the sequences of frames in which DC component in the FFT output indicates a new tone that would not be perceived as vibrato. When a median magnitude is subtracted from the sequence of detected pitches before applying an FFT analysis, a pitch transition from one tone to the next appears in the FFT output as a strong DC component. A clean pitch transition, of course, is perceived as a new tone, rather than as vibrato.

Methods for detecting vibrato in frames that represent an audio signal also can be practiced in electronic signal processing components. One component embodiment includes an input port adapted to receive a stream of data frames including detected pitches. It further includes an FFT processor coupled to the input that processes sequences of data frames in the stream and estimates rate and pitch depth of oscillations in pitch. A comparison processor receives output of the FFT processor and compares those estimates of rate in pitch depth and oscillations in pitch to an envelope of combinations of rates and pitch depths of oscillations that would be perceived by listeners as vibrato. An output port is coupled to the comparison processor to output results of the comparisons.

The FFT processor and/or the comparison processor of the signal processing component can be implemented using a digital signal processor or software running on a general-purpose central processing unit (CPU). Alternatively, you it can be implemented using a gate array or a custom circuit.

In the signal processing component described above, the FFT processor may apply a zero padded FFT to the detected pitches in the sequence of frames and the comparison processor may interpolate the rate and pitch depth of oscillations centered on at least one peak in output from the FFT processor to produce the estimates of rate and pitch depth of oscillations.

A first exclusion filter may be useful by itself or in combination with the components described above. This first exclusion filter processes an FFT analysis of pitch data and senses when a plurality of peaks in the estimates indicate a non-sinusoidal waveform that would not be perceived as vibrato. Excludes the corresponding sequence of frames from being reported as containing vibrato.

A second exclusion filter also may be useful by itself or in combination with the components described above. This exclusion filter processes an FFT analysis of pitch data and senses when a DC component in the estimates indicates a new tone that would not be perceived as vibrato. A DC component is present when a normalizing component subtracts from the sequence of detected pitches a median magnitude value before the sequence is processed by the FFT processor. Then, a clean pitch transition appears in the FFT output as a DC component. The DC component indicates a new tone that would not be perceived as vibrato and the second exclusion filter excludes the corresponding sequence of frames from being reported as containing vibrato.

Electronic signal processing component also may be described in means plus function terms. One electronic signal processing embodiment includes an input port adapted to receive a stream of data frames including detected pitches, and FFT means, comparison means and an output port. The FFT means is coupled to the input port. It is for processing the sequences of data frames in the stream and for estimating rate in pitch death of oscillations in pitch. The comparison means is for evaluating whether estimated rates in pitch depth would be perceived as vibrato, based on comparison to data representing a psychoacoustic envelope of perceived vibrato. The output port is coupled to the comparison means and reports results.

First and/or second exclusion means may be used in combination with the vibrato detection component. The first exclusion means is for detecting and excluding sequences in which the FFT output includes a plurality of peaks the indicated non-sinusoidal waveform that would not be perceived as vibrato. The second exclusion means is for detecting and excluding sequences in which a DC component of the FFT output indicates a new tone that would not be perceived as vibrato.

Once again, a computer readable storage medium can be configured with program instructions for carrying out or configuring a device to practice the methods described above.

Articles of Manufacture

The methods disclosed can be embodied in articles of manufacture. These articles of manufacture are computer readable storage media, such as rotating or nonvolatile memory. Rotating memory includes magnetic and optical disk drives and drums. Nonvolatile memory may be programmable or flash memory, magnetic or phase change memory or any number of variations on memory media described in the literature. The articles of manufacture also may be volatile memory manufactured by loading compiled or uncompiled computer program instructions from another place into memory. Volatile memory may be working memory or a battery backed quasi non-volatile storage medium.

Embodied in articles of manufacture, program instructions can either be loaded onto processors that carry out the methods described or combined with hardware to manufacture the hardware and software combination that practices the methods disclosed. Program instructions can be loaded onto a variety of processors that have associated memory, such as general-purpose CPUs, DSPs or programmable gate arrays. Program instructions can be used to configure devices to carry out the methods, such as programmable logic arrays our custom processor designs.

While we have disclosed technology by reference to preferred embodiments and examples detailed above, it is understood that these examples are in intended in an illustrative rather than limiting sense. Processing by computing devices is implicated in the embodiments described. Accordingly, the technology disclosed can be embodied in methods for pitch selection, voicing detection and vibrato detection, systems including logic and resources to carry out pitch selection, voicing detection and vibrato detection, systems that take advantage of pitch selection, voicing detection and vibrato detection, media impressed with program instructions to carry out pitch selection, voicing detection and vibrato detection, or computer accessible services to carry out pitch selection, voicing detection and vibrato detection. Devices that practice the technology disclosed can be manufactured by combining program instructions with hardware, for instance, by transmitting program instructions to a computing device as described or that carries out a method as described.

We claim as follows:

1. A method of voicing detection applied to sound that includes both unvoiced and voiced passages, the method including:

processing electronically a sequence of frames that include at least one pitch estimate per frame and one or more magnitude data per frame for harmonics of the pitch estimate;

filtering the sequence of frames for harmonic energy that exceeds a dynamically established harmonic energy threshold, including calculating a sum per frame that combines at least some of the magnitude data;

dynamically establishing the harmonic energy threshold to be used to identify frames as containing voiced content;

identifying frames as containing voiced content by comparing the calculated sum per frame to the dynamically established harmonic energy threshold;

outputting data regarding voiced content of the sequence of frames based on at least the identification of frames by the filtering for harmonic energy.

2. The method of claim 1, further including as part of the filtering prior to the calculating, excluding from the sum per frame calculation any of the magnitude data that have a frequency outside of a predetermined frequency band.

3. The method of claim 1, wherein the sum per frame is calculated using the magnitude squared.

4. The method of claim 1, further including as part of the filtering after to the calculating, applying a smoother to the calculated sums per frame across the frames.

5. The method of claim 1, further including adjusting the dynamically established harmonic energy threshold if a rate at which the frames were identified as containing voiced content exceeds a predetermined harmonic energy pass rate, reevaluating the calculated sums per frame against the adjusted dynamically established harmonic energy threshold.

6. The method of claim 1, wherein dynamically establishing the harmonic energy threshold further includes:

estimating a frequency distribution of occurrences of particular magnitudes across magnitudes present in the magnitude data;

identifying from the frequency distribution a maximum peak with a highest frequency of occurrence and other peaks in frequency of occurrence;

identifying a threshold peak by qualifying the maximum peak of those other peaks that are at least a predetermined height in relation to the maximum peak, choosing the qualifying peak with the greatest magnitude and setting the harmonic energy threshold at the magnitude of the chosen other peak.

7. The method of any of claim 1, further including:

identifying frames belonging streaks of successive frames with base harmonics present, based on evaluating the magnitude data for one or more of the base harmonics within a predetermined range of the pitch estimate and identifying the streaks of any of the base harmonics present in the successive frames that equal or exceed a predetermined base harmonics streak length; and outputting data regarding voiced content of the sequence of frames based on at least the identified frames that pass the filtering for harmonic energy and that belong to streaks that exceed the predetermined base harmonics streak length.

8. The method of any of claim 2, further including:

identifying frames belonging streaks of successive frames with base harmonics present, based on evaluating the magnitude data for one or more of the base harmonics within a predetermined range of the pitch estimate and identifying the streaks of any of the base harmonics present in the successive frames that equal or exceed a predetermined base harmonics streak length; and outputting data regarding voiced content of the sequence of frames based on at least the identified frames that pass the filtering for harmonic energy and that belong to streaks that exceed the predetermined base harmonics streak length.

9. The method of any of claim 5, further including:

identifying frames belonging streaks of successive frames with base harmonics present, based on evaluating the magnitude data for one or more of the base harmonics within a predetermined range of the pitch estimate and identifying the streaks of any of the base harmonics present in the successive frames that equal or exceed a predetermined base harmonics streak length; and outputting data regarding voiced content of the sequence of frames based on at least the identified frames that pass the filtering for harmonic energy and that belong to streaks that exceed the predetermined base harmonics streak length.

10. The method of any of claim 1, further including:

identifying frames belonging to streaks of successive frames with base harmonics present, based on evaluating the magnitude data for one or more of the base harmonics within a predetermined range of the pitch estimate and identifying the streaks of any of the base harmonics present in the successive frames that equal or exceed a predetermined base harmonics streak length;

identifying frames belonging to streaks of successive frames with extended harmonics present, based on evaluating the magnitude data for a sum of a plurality of the extended harmonics outside the predetermined range of the pitch estimate and identifying the streaks of the extended harmonics present in the successive frames that equal or exceed a predetermined extended harmonics streak length; and outputting data regarding voiced content of the sequence of frames based on at least the identified frames that pass the filtering for harmonic energy and that have been identified as belonging to a streak of frames containing base or extended harmonic longer than the predetermined base or extended harmonics streak length, respectively.

11. The method of any of claim 2, further including:

identifying frames belonging to streaks of successive frames with base harmonics present, based on evaluating the magnitude data for one or more of the base harmonics within a predetermined range of the pitch estimate and identifying the streaks of any of the base harmonics present in the successive frames that equal or exceed a predetermined base harmonics streak length;

identifying frames belonging to streaks of successive frames with extended harmonics present, based on evaluating the magnitude data for a sum of a plurality of the extended harmonics outside the predetermined range of the pitch estimate and identifying the streaks of the extended harmonics present in the successive frames that equal or exceed a predetermined extended harmonics streak length; and outputting data regarding voiced content of the sequence of frames based on at least the identified frames that pass the filtering for harmonic energy and that have been identified as belonging to a streak of frames containing base or extended harmonic longer than the predetermined base or extended harmonics streak length, respectively.

12. The method of any of claim 5, further including:

identifying frames belonging to streaks of successive frames with base harmonics present, based on evaluating the magnitude data for one or more of the base harmonics within a predetermined range of the pitch estimate and identifying the streaks of any of the base harmonics present in the successive frames that equal or exceed a predetermined base harmonics streak length;

identifying frames belonging to streaks of successive frames with extended harmonics present, based on evaluating the magnitude data for a sum of a plurality of the extended harmonics outside the predetermined range of the pitch estimate and identifying the streaks of the extended harmonics present in the successive frames that equal or exceed a predetermined extended harmonics streak length; and outputting data regarding voiced content of the sequence of frames based on at least the identified frames that pass the filtering for harmonic energy and that have been identified as belonging to a streak of frames containing base or extended harmonic longer than the predetermined base or extended harmonics streak length, respectively.

13. The method of claim 1, further including:

evaluating the streaks of successive frames for pitch stability, comprising determining whether pitch estimates for frames in subsequences of a predetermined sequence length exhibit pitch stability among the frames within a predetermined pitch stability range and retaining those frames exhibiting pitch stability as having voiced content; and determining whether a single frame with a pitch variance in the subsequence should be forgiven based on pitch stability within predetermined pitch stability range before and within a multiple of the predetermined pitch stability range after the single frame and retaining those frames, including the single frame, as having voiced content;

wherein the outputting data reflects the evaluating of pitch stability.

14. The method of claim 1, further including filtering out of the identified frames any frames belonging to short streaks of identified frames that are not part of a streak of successive frames that equal or exceed a predetermined identified frame streak length.

15. An electronic signal processing component for detection voicing, the component including:

an input port adapted to receive electronically a stream of data frames including at least one pitch estimate per frame and one or more magnitude data per frame for harmonics of the pitch estimate;

a first filter processor that calculates a sum per frame that combines at least some of the magnitude data;

dynamically establishes a harmonic energy threshold based on harmonic energy distribution across a plurality of frames;

identifies frames as containing voiced content by comparing the calculated sum per frame to the dynamically established harmonic energy threshold; and an output port coupled to the filtering processor that outputs data regarding voiced content of the sequence of frames based on at least the identification of frames by the first filtering processor.

16. The component of claim 15, further including a second filtering processor, operative before the first filtering processor, which excludes from the sum per frame calculation any of the magnitude data that have a frequency outside of a predetermined frequency band.

17. The component of claim 15, further including a smoother processor operating on the calculated sums per frame, coupled between the first filtering processor and the output port.

18. The component of claim 15, wherein the first filter processor further includes logic to readjust the dynamically established harmonic energy threshold, the logic adapted to determine if a rate at which the frames were identified as containing voiced content exceeds a predetermined harmonic energy pass rate and to repeat the comparison of the calculated sum per frame against an adjusted dynamically established harmonic energy threshold.

19. The component of claim 15, wherein the first filtering processor further includes logic to dynamically establish the harmonic energy threshold, the logic adapted to:

estimate a frequency distribution of occurrences of particular magnitudes across magnitudes present in the magnitude data;

identify from the frequency distribution a maximum peak with a highest frequency of occurrence and other peaks in frequency of occurrence;

identify a threshold peak among the other peaks by selecting among the maximum peak and the other peaks that are at least a predetermined height in relation to the maximum peak, choose the peak with the greatest harmonic magnitude and set the harmonic energy threshold at the magnitude of the chosen other peak.

20. The component of claim 15, further including a streak identification subcomponent, coupled after the first filtering processor, that includes logic to:

identify frames belonging streaks of successive frames with base harmonics present, based on evaluation of the magnitude data for one or more of the base harmonics within a predetermined range of the pitch estimate and identifying the streaks of any of the base harmonics present in the successive frames that equal or exceed a predetermined base harmonics streak length; and send to the output port data regarding voiced content of the sequence of frames based on at least the identified frames that pass the filtering for harmonic energy and that belong to streaks that exceed the predetermined base harmonics streak length.

21. The component of claim 16, further including a streak identification subcomponent, coupled after the first filtering processor, that includes logic to:

identify frames belonging to streaks of successive frames with base harmonics present, based on evaluation of the magnitude data for one or more of the base harmonics within a predetermined range of the pitch estimate and identifying the streaks of any of the base harmonics present in the successive frames that equal or exceed a predetermined base harmonics streak length; and send to the output port data regarding voiced content of the sequence of frames based on at least the identified frames that pass the filtering for harmonic energy and that belong to streaks that exceed the predetermined base harmonics streak length.

22. The component of claim 18, further including a streak identification subcomponent, coupled after the first filtering processor, that includes logic to:

identify frames belonging to streaks of successive frames with base harmonics present, based on evaluation of the magnitude data for one or more of the base harmonics within a predetermined range of the pitch estimate and identifying the streaks of any of the base harmonics present in the successive frames that equal or exceed a predetermined base harmonics streak length; and send to the output port data regarding voiced content of the sequence of frames based on at least the identified frames that pass the filtering for harmonic energy and that belong to streaks that exceed the predetermined base harmonics streak length.

23. The component of claim 15, further including a streak identification subcomponent, coupled after the first filtering processor, that includes logic to:

identify frames belonging to streaks of successive frames with base harmonics present, based on evaluation of the magnitude data for one or more of the base harmonics within a predetermined range of the pitch estimate and identifying the streaks of any of the base harmonics present in the successive frames that equal or exceed a predetermined base harmonics streak length;

identify frames belonging streaks of successive frames with extended harmonics present, based on evaluation of the magnitude data for a plurality of the extended harmonics outside a predetermined range of the pitch estimate and identifying the streaks of any of the extended harmonics present in the successive frames that equal or exceed a predetermined extended harmonics streak length; and send to the output port data regarding voiced content of the sequence of frames based on at least the identified frames that pass the filtering for harmonic energy and that belong to streaks that exceed the predetermined base harmonics streak length.

24. The component of claim 16, further including a streak identification subcomponent, coupled after the first filtering processor, that includes logic to:

identify frames belonging streaks of successive frames with base harmonics present, based on evaluation of the magnitude data for one or more of the base harmonics within a predetermined range of the pitch estimate and identifying the streaks of any of the base harmonics present in the successive frames that equal or exceed a predetermined base harmonics streak length;

identify frames belonging streaks of successive frames with extended harmonics present, based on evaluation of the magnitude data for a plurality of the extended harmonics outside a predetermined range of the pitch estimate and identifying the streaks of any of the extended harmonics present in the successive frames that equal or exceed a predetermined extended harmonics streak length; and send to the output port data regarding voiced content of the sequence of frames based on at least the identified frames that pass the filtering for harmonic energy and that belong to streaks that exceed the predetermined base harmonics streak length.

25. The component of claim 18, further including a streak identification subcomponent, coupled after the first filtering processor, that includes logic to:

identify frames belonging streaks of successive frames with base harmonics present, based on evaluation of the magnitude data for one or more of the base harmonics within a predetermined range of the pitch estimate and identifying the streaks of any of the base harmonics present in the successive frames that equal or exceed a predetermined base harmonics streak length;

identify frames belonging streaks of successive frames with extended harmonics present, based on evaluation of the magnitude data for a plurality of the extended harmonics outside a predetermined range of the pitch estimate and identifying the streaks of any of the extended harmonics present in the successive frames that equal or exceed a predetermined extended harmonics streak length; and send to the output port data regarding voiced content of the sequence of frames based on at least the identified frames that pass the filtering for harmonic energy and that belong to streaks that exceed the predetermined base harmonics streak length.

26. An signal processing component for detection voicing, the component including:

an input port adapted to receive a stream of data frames including at least one pitch estimate per frame;

first filtering means for identifying frames as containing voiced content by comparing a calculated sum per frame to a dynamically established harmonic energy threshold; and an output port coupled to the first filtering means that outputs data regarding voiced content of the sequence of frames based on at least the identification of frames by the first filtering means.

27. The signal processing component of claim 26, further including:

base harmonic presence means, coupled to the first filtering means and the output port, for identifying frames belonging streaks of successive frames with base harmonics present, based on evaluating the magnitude data for one or more of the base harmonics within a predetermined range of the pitch estimate and identifying the streaks of any of the base harmonics present in the successive frames that equal or exceed a predetermined base harmonics streak length.

28. The signal processing component of claim 27, further including:

extended harmonic presence means, coupled to the first filtering means and the output port and cooperating with the base harmonic presence means, for identifying frames belonging streaks of successive frames with extended harmonics present, based on evaluating the magnitude data for a plurality of the extended harmonics outside a predetermined range of the pitch estimate and identifying the streaks of any of the base harmonics present in the successive frames that equal or exceed a predetermined base harmonics streak length.

29. The signal processing component of claim 26, further including:

pitch stability means, coupled before the output port, for evaluating the streaks of successive frames for pitch stability and passing the results of the evaluating to the output port.

30. The signal processing component of claim 26, further including:

short streak exclusion means, coupled before the output port, for filtering out of the identified frames any frames belonging to short streaks of identified frames that are not part of a streak of successive frames that equal or exceed a predetermined identified frame streak length.

31. A volatile or non-volatile computer readable storage medium including program instructions for carrying out a method including:

processing electronically a sequence of frames that include at least one pitch estimate per frame and one or more magnitude data per frame for harmonics of the pitch estimate;

filtering the sequence of frames for harmonic energy that exceeds a dynamically established harmonic energy threshold, including calculating a sum per frame that combines at least some of the magnitude data;

dynamically establishing the harmonic energy threshold to be used to identify frames as containing voiced content;

identifying frames as containing voiced content by comparing the calculated sum per frame to the dynamically established harmonic energy threshold;

outputting data regarding voiced content of the sequence of frames based on at least the identification of frames by the filtering for harmonic energy.

32. The computer readable storage medium of claim 31, wherein at least some of the program instructions are adapted to run on a digital signal processor (hereinafter "DSP").

33. The computer readable storage medium of claim 31, wherein the program instructions are adapted to produce a gate array.

* * * * *